(12) United States Patent
Kojima

(10) Patent No.: US 6,327,294 B1
(45) Date of Patent: Dec. 4, 2001

(54) SOLID-STATE LASER APPARATUS

(75) Inventor: Tetsuo Kojima, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/176,939

(22) Filed: Oct. 22, 1998

(30) Foreign Application Priority Data

Oct. 24, 1997 (JP) .................................................. 9-292551

(51) Int. Cl.[7] ................ H01S 3/13; H01S 3/04; H01S 3/08

(52) U.S. Cl. .............. 372/101; 372/29.02; 372/34; 372/36; 372/99

(58) Field of Search ................ 372/101, 29.02, 372/34, 36, 99

(56) References Cited

U.S. PATENT DOCUMENTS

| | | | |
|---|---|---|---|
| 3,858,056 | * 12/1974 | Melamed et al. | 307/88.3 |
| 4,803,694 | * 2/1989 | Lee et al. | 372/98 |
| 5,046,070 | * 9/1991 | Negus | 372/33 |
| 5,079,772 | * 1/1992 | Negus et al. | 372/18 |
| 5,386,427 | * 1/1995 | Zahowski | 372/34 |
| 5,930,283 | * 7/1999 | Imai et al. | 372/94 |

FOREIGN PATENT DOCUMENTS

96/35246  11/1996 (WO) ................... H01S/3/0941

OTHER PUBLICATIONS

John M. Eggleston, Periodic Resonator for Average–Power Scaling of Stable–Resonator Solid–State Lasers, IEEE Journal of Quantum Electronics, vol. 24, No. 9, Sep. 1998.*
Optical Electronics, 4th ed., Holt, Rinechart and Winston, Inc., pp. 125–127.

* cited by examiner

Primary Examiner—Leon Scott, Jr.
Assistant Examiner—Armando Rodriguez
(74) Attorney, Agent, or Firm—Sughrue, Mion, Zinn, Macpeak & Seas, PLLC

(57) ABSTRACT

In a solid-state laser apparatus, an optical resonator 7a is formed into a stable resonator by combing a solid-state laser medium 3a, a thermal lens F1 generated in the solid-state laser medium 3a, a wavelength-converting device 17, a thermal lens F2 generated in the wavelength-converting device 17, a reflecting mirror 4a and a harmonic mirror 19.

15 Claims, 8 Drawing Sheets

SOLID-STATE LASER APPARATUS

BACKGROUND OF THE INVENTION

1. Field of the Invention

The present invention relates to a solid-state laser apparatus which is capable of stably generating high-power laser beams having a satisfactory quality.

2. Description of the Related Art

FIG. 13 is a schematic view showing a conventional semiconductor laser exciting solid-state laser apparatus disclosed in, for example, PCT WO96/35246. Referring to the drawing, reference numeral 1 represents a semiconductor laser, 2 represents exciting light, 3 represents a solid-state laser medium containing an active solid medium, 4 represents a reflecting mirror, 5 represents a partial reflecting mirror, 6 represents a laser beam, 7 represents an optical resonator, 8 represents an optical fiber, 9 represents a lens for collimating exciting light and 11 represents a lens for converging exciting light. Referring to the drawing, symbol L represents a length of the resonator and L1 represents a distance from the reflecting mirror 4 to the solid-state laser medium 3. Symbol L2 represents a distance from the partial reflecting mirror 5 to the solid-state laser medium 3. Symbol F represents a focal distance of a thermal lens generated in the solid-state laser medium. The optical resonator 7 incorporates the reflecting mirror 4, the partial reflecting mirror 5, the solid-state laser medium 3 and the thermal lens F realized by dint of distribution of temperatures in the solid-state laser medium.

The conventional semiconductor laser exciting solid-state laser apparatus has the above-mentioned structure. Thus, exciting light 2 emitted from the semiconductor laser 1 is transmitted through the optical fiber 10, and then introduced into the solid-state laser medium 3 by dint of the lenses 8 and 9. Thus, the solid-state laser medium 3 is excited so as to be formed into a laser amplifying medium. Moreover, the thermal lens having a focal distance F is generated in the solid-state laser medium. Naturally emitted light generated by the laser amplifying medium is amplified during reciprocating motions between the reflecting mirror 4 and the partial reflecting mirror 5. Thus, a laser beam 6 having excellent directivity is generated. When the intensity of the laser beam 6 exceeds a predetermined level, the laser beam 6 is emitted to the outside from the partial reflecting mirror 5.

As disclosed in a document (Optical Electronics, 4th ed., Holt, Rinechart and Winston, Inc,. pp. 125–127), a formula showing a stabilizing condition for a resonator and using beam matrix elements A, B, C and D with respect to light which reciprocates one time in the resonator is represented as follows:

$$-1<(A+D)/2<1 \tag{1}$$

A beam matrix required to represent the stabilizing condition for a resonator will now be described. Transmission and reflection characteristics of a beam for a various optical elements can be represented by a beam matrix which is a matrix composed of two rows and two columns. Elements of the beam matrix are represented by A, B, C and D. Assuming that a symmetrical axis of a cylindrical coordinates which is an optical axis of each optical element is axis z, a distance on a plane of incident on the optical element from an optical axis of a beam is rin, inclination of the beam drin/dz is rin', a distance on an emission place of the optical element from the optical axis of the beam is rout and inclination of the beam is drout/dz is rout', the foregoing factors can be related with one another by two equations which are rout=Arin+Brin' and rout'=Crin+Drin'. When column matrix r1={rin, rin'} and r2={rout, rout'} are used and the beam matrix is represented by M, the two equations can be expressed as r2=mr1 by using a rule of the product of matrices. The relationship between column matrix r1 of incident light and column matrix r2 of emission light in a case where light passes through, for example, two optical elements is made to be r2=M2M1r1 by arranging the beam matrices in accordance with the rule of the product of the matrices on the assumption that the beam matrix representing a first optical element is M1 and the beam matrix representing the second beam matrix is M2. Similarly, a column matrix of emission light in a case where light passes through a larger number of optical elements can be obtained by calculating the product of the beam matrix of each optical element and the column matrix of incident light in accordance with the rule of the product of matrices. A representative beam matrix representing an optical element will now be described. A beam matrix representing a free space having a refractive index of n0 and a length of L is {A, B, C, D}={1,L/n0, 0, 1). A beam matrix representing a thin lens having a refractive index of f is {A, B, C, D}={1, 0,–1/f, 1} if a case in which f>0 is assumed as a condensing lens. A beam matrix representing a spherical reflecting mirror having a curvature radius of R is {A, B, C, D}={1, 0,–2/R, 1} if a case in which R>0 is a concave reflecting mirror. A beam matrix representing a dielectric medium interface having a refractive index of an incident portion of n1, a refractive index of an emission portion of n2 and a curvature radius of R is {A, B, C, D}={1, 0, (n2–n1)/n2R, n1/n2} if a case in which R>0 is a concave. The stabilizing condition for the optical resonator can be obtained from a condition that a light beam must be returned to an original state after it has reciprocated in the optical resonator in a stable mode. Assuming that elements of a beam matrix indicating one reciprocating motion in the optical resonator are A, B, C and D, the condition is –1<(A+D)/2<1.

A stabilizing condition for the resonator of the conventional semiconductor laser exciting solid-state laser apparatus shown in FIG. 13 can be obtained by assuming a curvature radius of the reflecting mirror 4 is R1 and a curvature radius of the partial reflecting mirror 5 is R2 and by adding one to the stabilizing equation and by dividing a result of the addition with two, the stabilizing condition being represented as follows:

$$0<(1-L2/F-(L1+L2-(L1L2/F))/R1)(1-L1/F-(L1+L2-(L1L2/F))/R2)<1 \tag{2}$$

Since the conventional semiconductor laser exciting solid-state laser apparatus has an arrangement with which L1<<L2, F=L, R1 and R2>>L are satisfied, the stabilizing condition for the resonator is satisfied.

The conventional solid-state laser apparatus has the structure that the optical resonator is made to be a stable resonator by the reflecting mirror, the partial reflecting mirror, the solid-state laser medium and the thermal lens generated in the solid-state laser medium by dint of exciting light. Therefore, if a wavelength converting device or a transmission optical device which generate a thermal lens exists in the optical resonator, the stabilizing condition for the resonator cannot be satisfied. Therefore, the conventional structure cannot stably and efficiently generate high-power laser beams.

The conventional solid-state laser apparatus is structured in consideration of only exciting light as a factor for generating a thermal lens. Therefore, if a thermal lens is generated in the wavelength-converting device or a transmission optical device in the resonator because of a factor other than exciting light, such as a laser beam, the stabilizing condition for a resonator cannot be satisfied. Therefore, the conventional structure cannot stably and efficiently generate high-power laser beams.

The conventional solid-state laser apparatus is structured in consideration of only exciting light as a factor for generating a thermal lens. Therefore, if a thermal lens is generated in the wavelength-converting device or a transmission optical device in the resonator because of a factor other than exciting light, such as a laser beam, an optical resonator which is able to satisfy the stabilizing condition for a resonator cannot be designed.

SUMMARY OF THE INVENTION

To solve the above-mentioned problems, an object of the present invention is to provide a solid-state laser apparatus having a structure in which a stable resonator is constituted by including thermal lenses of a wavelength-converting device and a transmission optical device other than a solid-state laser medium in the optical resonator so as to be capable of stably and efficiently generating high-power laser beams.

Another object of the present invention is to provide a solid-state laser apparatus having a structure in which a stable resonator is constituted by including thermal lenses of a wavelength-converting device and a transmission optical device other than a solid-state laser medium generated because of a factor other than exciting light so as to be capable of stably and efficiently generating high-power laser beams.

According to a first aspect of the invention, there is provided a solid-state laser apparatus having an optical resonator, said optical resonator comprising:

at least one solid-state laser medium extending in a direction of an optical axis of a laser beam and containing an active solid medium therein;

an exciting light source for exciting said solid-state laser medium and generating a thermal lens in said solid-state laser medium;

at least one wavelength-converting device for converting a wavelength of the laser beam, absorbing a portion of the laser beam and generating a thermal lens therein; and an optical device having at least one reflecting mirror and at least one harmonic mirror for resonating the laser beam emitted from said solid-state laser medium and extracting the laser beam having the wavelength converted by said wavelength-converting device;

wherein stable conditions are satisfied for a combination of said solid-state laser medium, said thermal lens generated in said solid-state laser medium, said wavelength-converting device, said thermal lens generated in said wavelength-converting device, said reflecting mirror and said harmonic mirror.

According to a second aspect of the invention, there is provided a solid-state laser apparatus according to the first aspect, wherein said optical resonator further comprises at least one transmission optical device for absorbing a portion of the laser beam and generating a thermal lens therein, wherein stable conditions are satisfied for a combination of said solid-state laser medium, said thermal lens generated in said solid-state laser medium, said wavelength-converting device, said thermal lens generated in said wavelength-converting device, said transmission optical device, said thermal lens generated in said transmission optical device, said reflecting mirror and said harmonic mirror.

According to a third aspect of the invention, there is provided a solid-state laser apparatus having an optical resonator, said optical resonator comprising:

at least one solid-state laser medium extending in a direction of an optical axis of a laser beam and containing an active solid medium therein;

an exciting light source for exciting said solid-state laser medium and generating a thermal lens in said solid-state laser medium;

at least one transmission optical device for absorbing a part of the laser beam and generating a thermal lens therein; and an optical device including at least one reflecting mirror and at least one partial reflecting mirror for extracting the laser beam from said solid-state laser medium;

wherein stable conditions are satisfied for a combination of said solid-state laser medium, said thermal lens generated in said solid-state laser medium, said transmission optical device, said thermal lens generated in said transmission optical device, said reflecting mirror and said partial reflecting mirror.

According to a fourth aspect of the invention, there is provided a solid-state laser apparatus according to the first aspect, wherein said optical resonator further comprises: at least one transmission optical device having a rate of change in a refractive index with temperature having a reverse sign to that of a rate of change in refractive index with temperature of said wavelength-converting device, absorbing a portion of the laser beam and generating a thermal lens therein.

According to a fifth aspect of the invention, there is provided a solid-state laser apparatus according to the first aspect, wherein said optical resonator further comprises: at least one lens having a focal distance having a reverse sign to that of said thermal lens generated in said wavelength-converting device.

According to a sixth aspect of the invention, there is provided a solid-state laser apparatus according to the first aspect, wherein said exciting light source comprises a semiconductor laser unit.

According to a seventh aspect of the invention, there is provided a solid-state laser apparatus according to the first aspect, wherein distances among said solid-state laser medium, said wavelength-converting device, said reflecting mirror and said harmonic mirror are determined in such a manner that beam matrix elements A, B, C and D indicating one reciprocating motion of said optical resonator satisfy a relationship $-1<(A+D)/2<1$.

According to an eighth aspect of the invention, there is provided a solid-state laser apparatus according to the first aspect, wherein distances among said solid-state laser medium, said wavelength-converting device, said transmission optical device, said reflecting mirror and said harmonic mirror are determined in such a manner that beam matrix elements A, B, C and D indicating one reciprocating motion of said optical resonator satisfy a relationship $-1<(A+D)/2<1$.

According to a ninth aspect of the invention, there is provided a solid-state laser apparatus according to the third aspect, wherein distances among said solid-state laser medium, said transmission optical device, said reflecting mirror and said partial reflecting mirror are determined in such a manner that beam matrix elements A, B, C and D indicating one reciprocating motion of said optical resonator satisfy a relationship $-1<(A+D)/2<1$.

According to a tenth aspect of the invention, there is provided a solid-state laser apparatus according to the seventh aspect, wherein the distances among said solid-state laser medium, said wavelength-converting device, said reflecting mirror and said harmonic mirror are determined in such a manner that beam matrix elements A, B, C and D indicating one reciprocating motion of said optical resonator satisfy a relationship $-0.99<(A+D)/2<0.99$.

According to an eleventh aspect of the invention, there isp provided a solid-state laser apparatus according to the tenth aspect, wherein said optical resonator further comprises at least one transmission optical device for absorbing a portion of the laser beam and generating a thermal lens therein, and distances among said solid-state laser medium, said wavelength-converting device, said transmission optical device, said reflecting mirror and said harmonic mirror are determined in such a manner that beam matrix elements A, B, C and D indicating one reciprocating motion of said optical resonator satisfy a relationship $-0.99<(A+D)/2<0.99$.

According to a twelfth aspect of the invention, there is provided a solid-state laser apparatus according to the third aspect, wherein distances among said solid-state laser medium, said transmission optical device, said reflecting mirror and said partial reflecting mirror are determined in such a manner that beam matrix elements A, B, C and D indicating one reciprocating motion of said optical resonator satisfy a relationship $-0.99<(A+D)/2<0.99$.

According to a thirteenth aspect of the invention, there is provided a solid-state laser apparatus according to the first aspect, wherein distances among said solid-state laser medium, said wavelength-converting device, said reflecting mirror and said harmonic mirror are determined in such a manner that beam matrix elements A1, B1, C1 and D1, which are realized when an output value from said exciting light source is a different value from an output value from said exciting light source at which beam matrix elements A, B, C and D indicating one reciprocating motion of said optical resonator satisfy $-1<(A+D)/2<1$, and which indicate one reciprocating motion of said optical resonator, satisfy a relationship $(A1+D1)/2=(A+D)/2$ or $(A1+D1)/2=-(A+D)/2$.

According to a fourteenth aspect of the invention, there is provided a solid-state laser apparatus according to the thirteenth aspect, wherein said optical resonator further comprises at least one transmission optical device for absorbing a portion of the laser beam and generating a thermal lens therein, and distances among said solid-state laser medium, said wavelength-converting device, said transmission optical device, said reflecting mirror and said harmonic mirror are determined in such a manner that beam matrix elements A1, B1, C1 and D1, which are realized when an output value from said exciting light source is a different value from an output value from said exciting light source at which beam matrix elements A, B, C and D indicating one reciprocating motion of said optical resonator satisfy $-1<(A+D)/2<1$, and which indicate one reciprocating motion of said optical resonator, satisfy a relationship $(A1+D1)/2=(A+D)/2$ or $(A1+D1)/2=(A+D)/2$.

According to a fifteenth aspect of the invention, there is provided a solid-state laser apparatus according to the third aspect, wherein distances among said solid-state laser medium, said transmission optical device, said reflecting mirror and said partial reflecting mirror are determined in such a manner that beam matrix elements A1, B1, C1 and D1, which are realized when an output value from said exciting light source is a different value from an output value from said exciting light source at which beam matrix elements A, B, C and D indicating one reciprocating motion of said optical resonator satisfy $-1<(A+D)/2<1$, and which indicate one reciprocating motion of said optical resonator, satisfy a relationship $(A1+D1)/2=(A+D)/2$ or $(A1+D1)/2=-(A+D)/2$.

DETAILED DESCRIPTION OF THE PREFERRED EMBODIMENTS

Now, a description will be given in more detail of preferred embodiments of the invention with reference to the accompanying drawings.

First Embodiment

Figure 1:
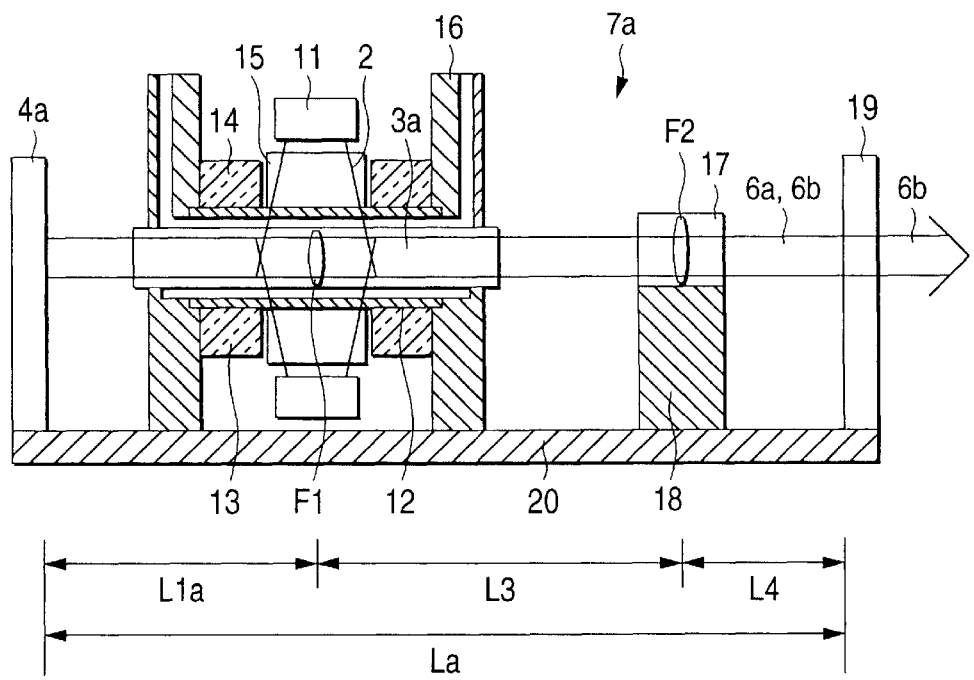
FIG. 1 is a vertical cross sectional view showing the structure of a solid-state laser apparatus according to a first embodiment of the present invention.

FIG. 1 is a vertical cross sectional view showing a solid-state laser apparatus according to a first embodiment of the present invention. Referring to the drawing, reference numeral 3a represents a solid-state laser medium containing an active solid-state laser medium and made of, for example, Nd:YAG (Nd:Yttrium Aluminum Garnet) containing 0.6 atom % to 1.1 atom % Nd. The solid-state laser medium 3a is formed into a rod shape having a circular cross section. Reference numeral 11 represents a semiconductor laser array and 2 represents exciting light emitted from the semiconductor laser array 11. Reference numeral 12 represents a flow tube. A cooling medium is allowed to pass through a position between the flow tube 12 and the solid-state laser medium 3a. Reference numeral 13 represents a light converging unit disposed to surround the solid-state laser medium 3a, the light converging unit being a diffuse reflection light converging unit having a diffuse reflection inner surface or a light converging unit having a gold inner surface subjected to a mirror finish or a light converging unit having a glass inner surface subjected to total reflection coating against exciting light 2. The light converging unit 13 has an opening 14. Reference numeral 15 represents a light-conducting optical device for conducting exciting light 2. The light-conducting optical device 15 is made of sapphire having a plate-like shape having a thickness of, for example, about 0.5 mm or YAG (Yttrium Aluminum Garnet) free from doping or glass, such as SF10, having a high refractive index against exciting light 2. The end surfaces of the light-conducting optical device 15 are subjected to non-reflection coating against exciting light and disposed in the opening 14. The semiconductor laser array 11 is disposed in close contact with the end surface of the light-conducting optical device 15 in order cause exciting light 2 to be introduced through the end surface of the light-conducting optical device 15 such that substantially no loss takes place. Reference numeral 16 represents a side plate having a mechanism for supporting the solid-state laser medium 3a, the flow tube 12 and the light converging unit 13 and a mechanism for introducing the cooling medium from outside of the apparatus into the flow tube 12. Reference numeral 17 represents a wavelength-converting device made of, for example, KTiOPO4 or LiBO3. Reference numeral 18 represents a cooling unit for cooling the wavelength-converting device 17. Reference numeral 6a represents a fundamental-wave laser beam and 6b represents a harmonic-wave laser beam having a wavelength converted by the wavelength-converting device 17. Reference numeral 7a represents an optical resonator for resonating the fundamental-wave laser beam 6a and extracting the harmonic-wave laser beam 6b. Reference numerals 4a and 19 represent optical devices disposed at ends of the optical resonator 7a. Reference numeral 4a represents a reflecting mirror. Reference numeral 19 represents a harmonic mirror for reflecting the fundamental-wave laser beam and permits transmission of the harmonic-wave laser beam. Reference numeral 20 represents a frame on which the side plate 16, the cooling unit 18, the reflecting mirror 4a and the harmonic mirror 19 are mounted. Symbol La represents a length of the resonator, L1a represents a distance from the reflecting mirror 4a to the solid-state laser medium 3a, L3 represents a distance from the solid-state laser medium 3a to the wavelength-converting device 17 and L4 represents a distance from the wavelength-converting device 17 to the harmonic mirror 19. Symbol F1 represents a focal distance of a thermal lens generated in the solid-state laser medium and F2 represents a focal distance of a thermal lens generated in the wavelength-converting device. Note that a power source for supplying an electric current to the semiconductor laser array 11, a cooling medium, a cooling-medium circulating unit for circulating the cooling medium and tubes are omitted from the drawing.

The optical resonator 7a is formed into a stable resonator by the reflecting mirror 4a, the solid-state laser medium 3a, the thermal lens F1 in the solid-state laser medium, the wavelength-converting device 17, the thermal lens F2 generated in the wavelength-converting device and the harmonic mirror 19. That is, an assumption is made that elements of a beam matrix with respect to light which reciprocates in the resonator one time are A, B, C and D, the following stabilizing condition formula of a resonator is satisfied:

$$-1 < (A+D)/2 < 1 \qquad (3)$$

Another assumption is made that a curvature radius of the reflecting mirror 4a is R1a, a curvature radius of the harmonic mirror 19 is R2a and the following condition is provided:

$$L0 = L1a + L3 + L4 - L1a(L3+L4)/F1 - L4(L1a+L3)/F2 + L1aL3L4/(F1\ F2) \qquad (4)$$

The structure is arranged in such a manner that the following stabilizing condition for a resonator is satisfied:

$$0 < (1-(L3+L4)/F1-L4/F2+L3\ L4/(F1\ F2)-L0/R1a)\ (1-(L1a+L3)/F2-L1a/F1+L1aL3/(F1\ F2)-L0/R2a) < 1 \qquad (5)$$

In the solid-state laser apparatus structured as described above, exciting light 2 emitted from the semiconductor laser array 11 is introduced into the light-conducting optical device 15 without any remarkable loss. The light-conducting optical device 15 is made of sapphire or YAG (Yttrium Aluminum Garnet) or glass, such as SF10 having a high refractive index against exciting light 2 and has a high refractive index of about 1.7 to about 1.8. Therefore, exciting light 2 diagonally made incident on the inside portion of the light-conducting optical device 15 is totally reflected by the upper and lower surfaces of the light-conducting optical device 15. Thus, exciting light 2 is introduced into the light converging unit 13 without any remarkable loss. The solid-state laser medium 3a is, from the side surface thereof, excited with exciting light 2 introduced into the light converging unit 13 so that solid-state laser medium 3a is converted into a laser amplifying medium for amplifying the fundamental-wave laser beam 6a. A portion of exciting light 2 which has not been absorbed by the solid-state laser medium 3a is allowed to pass through the solid-state laser medium 3a, and reflected by the inner surface of the light converging unit 13. Then, exciting light 2 again excites the solid-state laser medium 3a.

A component of exciting light 2 which has been absorbed by the solid-state laser medium 3a and which has not been converted into the fundamental-wave laser beam 6a is converted into heat. The solid-state laser medium 3a heated with the foregoing heat is cooled by the cooling medium which flows in the flow tube 12 disposed adjacent to the solid-state laser medium 3a. As a result, temperature distribution takes place in which the temperatures in the vicinity of the central portion are high and temperatures in the vicinity of the side surfaces are low. Since change in the refractive index of the solid-state laser medium 3a is substantially in proportion to the temperature, the temperature distribution generated in the solid-state laser medium 3a causes the refractive indexes to be varied in the solid-state laser medium 3a. Thus, the thermal lens F1 is generated.

Naturally emitted light generated by the excited solid-state laser medium 3a is amplified during reciprocation of light in the optical resonator so that light is converted into the fundamental-wave laser beam 6a having satisfactory directivity. The wavelength of a portion of the fundamental-wave laser beam 6a is converted by the wavelength-converting device 17 so that the portion is converted into the harmonic-wave laser beam 6b. The harmonic-wave laser beam 6b having the converted wavelength is allowed to pass through the harmonic mirror 19. Thus, the harmonic-wave laser beam 6b can be extracted to the outside portion.

Portions of the fundamental-wave laser beam 6a and harmonic-wave laser beam 6b are absorbed by the wavelength-converting device 17 so as to be converted into heat. The wavelength-converting device 17 heated by the foregoing heat is cooled by the cooling unit disposed adjacently. As a result, temperature distribution takes place in which the temperatures in the vicinity of the central portion are high and temperatures in the vicinity of the side surfaces are low. Since change in the refractive index of the wavelength-converting device 17 is substantially in proportion to the temperature, the temperature distribution generated in the wavelength-converting device 17 causes the refractive indexes to be varied in the wavelength-converting device 17. Thus, the thermal lens F2 is generated.

Figure 2:
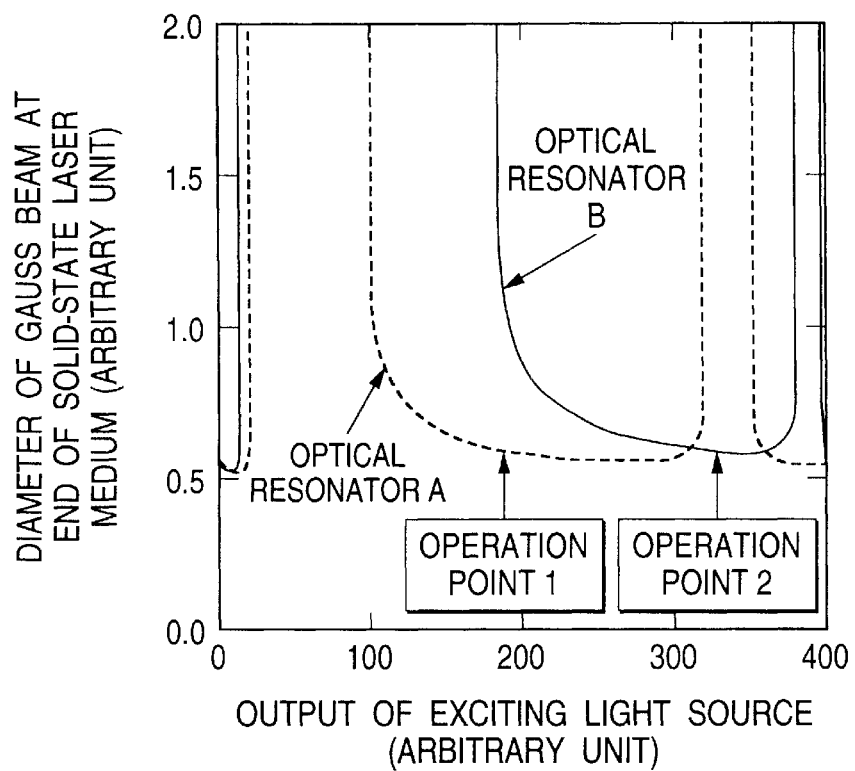
FIG. 2 is a graph showing the relationship between outputs of exciting light source and diameters of gauss beams at an end of a solid-state laser medium realized in the solid-state laser apparatus according to the present invention.

With reference to FIG. 2 showing the relationship between outputs of the exciting light source and gauss beam diameters at an end of the solid-state laser medium, a stabilizing condition for the optical resonator will now be described. Referring to the drawing, a dashed line shows a case (a optical resonator A) when the distance from the reflecting mirror 4a to the solid-state laser medium 3a is L1a, the distance from the solid-state laser medium 3a to the wavelength-converting device 17 is L3 and the distance from the wavelength-converting device to the harmonic mirror is L4. A solid lines shows a case (an optical resonator B) when the distance from the reflecting mirror 4a to the solid-state laser medium 3a is L1a+dL1a, the distance from the solid-state laser medium 3a to the wavelength-converting device 17 is L3+dL3 and the distance from the wavelength-converting device to the harmonic mirror is L4+dL4. An assumption is made that the focal distance of a thermal lens generated in the solid-state laser medium is F1 and the focal distance of a thermal lens generated in the wavelength-converting device is F2 with respect to an output of the exciting light source at an illustrated operation point 1. Another assumption is made that the focal distance of a thermal lens generated in the solid-state laser medium is F1+dF1 and the focal distance of a thermal lens generated in the wavelength-converting device is F2+dF2 with respect to an output of the exciting light source at an illustrated operation point 2. In the case of the optical resonator A, the diameter of the gauss beam at the end of the solid-state laser medium exists as a finite value at the operation point 1. Therefore, the stabilizing condition for a resonator can be satisfied. However, at the operation pint 2, the diameter of the gauss beam at the end of the solid-state laser medium does not exist as a finite value. Therefore, the stabilizing condition for a resonator cannot be satisfied. The optical resonator B having the diameter of the gauss beam at the end of the solid-state laser medium exists as a finite value and satisfying the stabilizing condition for the resonator can be designed by setting dL1a, dL3 and dL4 in such a manner that the following relationship is satisfied from beam matrix elements A1, B1, C1 and D1 indicating one reciprocating motion at an output of the exciting light source at the operation point 1 which satisfies the stabilizing condition for the optical resonator A and beam matrix elements A2, B2, C2 and D2 indicating one reciprocating motion at an output of the exciting light source at the operation point 2 of the optical resonator B:

$$(A2+D2)/2=(A1+D1)/2 \quad (6)$$

That is, also dL1a, dL3 and dL4 are set in such a manner that the following relationship is satisfied:

$$((dF1\ dF2\ dL1a\ F1\ F2\ L1a+dF1\ dF2\ dL3\ F1\ F2\ L3-dF2\ dL1$$

$$i\ a\ dL3\ F2\ L1a\ L3+d\ F1\ dF2\ dL4\ F1\ F2\ L4-dF1\ dL1a\ dL4\ F1\ L1a\ L4-dF2$$

$$dL1a\ dL4\ F2\ L1a\ L4-dF1\ dL3\ dL4\ F1\ L3\ L4+dL1a\ dL3\ dL4\ L1a\ L3\ L4-$$

$$dF1\ dF2\ F1\ F2\ R1a+dF2\ dL3\ F2\ L3\ R1a+dF1\ dL4\ F1\ L4\ R1a+dF2\ dL4$$

$$F2\ L4\ R1a-dL3\ dL4\ L3\ L4\ R1a)(dF1\ dF2\ dL1a\ F1\ F2\ L1a+dF1\ dF2\ dL3$$

$$F1\ F2\ L3-dF2\ dL1a\ dL3\ F2\ L1a\ L3+dF1\ dF2\ dL4\ F1\ F2\ L4-dF1\ dL1a$$

$$dL4\ F1\ L1a\ L4-dF2\ dL1a\ dL4\ F2\ L1a\ L4-dF1\ dL3\ dL4\ F1\ L3\ L4+dL1a$$

$$dL3\ dL4\ L1a\ L3\ L4-dF1\ dF2\ F1\ F2\ R2a+dF1\ dL1a\ F1\ L1a\ R2a+dF2$$

$$dL1a\ F2\ L1a\ R2a+dF1\ dL3\ F1\ L3\ R2a-dL1a\ dL3\ L1a\ L3\ R2a))/(dF1\char`\^2$$

$$dF2\char`\^2\ F2\char`\^2\ R1a\ R2a)=((F1\ F2\ L1a+F1\ F2\ L3-F2\ L1a\ L3+F1\ F2\ L4-F1\ L1a\ L4-F2$$

$$L1a\ L4-F1\ L3\ L4+L1a\ L3\ L4-F1\ F2\ R1a+F2\ L3\ R1a+F1\ L4\ R1a+F2\ L4$$

$$R1a-L3\ L4\ R1a)(F1\ F2\ L1a+F1\ F2\ L3-F2\ L1a\ L3+F1\ F2\ L4-F1\ L1a\ L4-$$

$$F2\ L1a\ L4-F1\ L3\ L4+L1a\ L3\ L4-F1\ F2\ R2a+F1\ L1a\ R2a+F2\ L1a\ R2a+F1$$

$$L3\ R2a-L1a\ L3\ R2a))/(F1\char`\^2\ F2\char`\^2\ R1a\ R2a) \quad (7)$$

When dL1a, dL3 and dL4 are set to satisfy the following relationship:

$$(A2+D2)/2=-(A1+D1)/2 \quad (8)$$

The optical resonator B can be designed. That is, when dL1a, dL3 and dL4 are set in such a manner that the following relationship is satisfied, the optical resonator B can be designed:

$$((dF1\ dF2\ dL1a\ F1\ F2\ L1a+dF1\ dF2\ dL3\ F1\ F2\ L3-dF2\ dL1a$$

$$dL3\ F2\ L1a\ L3+dF1\ dF2\ dL4\ F1\ F2\ L4-dF1\ dL1a\ dL4\ F1\ L1a\ L4-dF2$$

$$dL1a\ dL4\ F2\ L1a\ L4-dF1\ dL3\ dL4\ F1\ L3\ L4+dL1a\ dL3\ dL4\ L1a\ L3\ Ld-$$

$$dF1\ dF2\ F1\ F2\ R1a+dF2\ dL3\ F2\ L3\ R1a+dF1\ dL-4\ F1\ L4\ R1a+dF2\ dL4$$

$$F2\ L4\ R1a-dL3\ dL4\ L3\ L4\ R1a)(dF1\ dF2\ dL1a\ F1\ F2\ L1a+dF1\ dF2\ dL3$$

$$F1\ F2\ L3-dF2\ dL1a\ dL3\ F2\ L1a\ L3+dF1\ dF2\ dL4\ F1\ F2\ L4-dF1\ dL1a$$

$$dL4\ F1\ L1a\ L4-dF2\ dL1a\ dL4\ F2\ L1a\ L4-dF1\ dL3\ dL4\ F1\ L3\ L4+dL1a$$

$$dL3\ dL4\ L1a\ L3\ L4-dF1\ dF2\ F1\ F2\ R2a+dF1\ dL1a\ F1\ L1a\ R2a+dF2$$

$$dL1a\ F2\ L1a\ R2a+dF1\ dL3\ F1\ L3\ R2a-dL1a\ dL3\ L1a\ L3\ R2a))/(dF1\char`\^2$$

$$dF2\char`\^2\ F1\char`\^2\ F2\char`\^2\ R1a\ R2a)=((-(F1\ F2\ L1a)-F1\ F2\ L3+F2\ L1a\ L3-F1\ F2\ L4+F1\ L1a$$

$$L4+F2\ L1a\ L4+F1\ L3\ L4-L1a\ L3\ L4)(F1\ F2\ L1a+F1\ F2\ L3-F2\ L1a$$

L3+F1 F2 L4−F1 L1a L4−F2 L1a L4−F1 L3 L4+L1a L3 L4−F1 F2 R1a+F2

L3 R1a+F1 L4 R1a+F2 L4 R1a−L3 L4 R1a−F1 F2 R2a+F1 L1a R2a+F2

L1a R2a+F1 L3 R2a−L1a L3 R2a−F1 R1a R2a−F2 R1a R2a+L3 R1a $$R2a))/(F1\hat{}2\ F2\hat{}2\ R1a\ R2a) \qquad (9)$$

The value of a portion of dL1a, dL3 and dL4 may be fixed and the values of the residual factors may be obtained. As a result, the parameter which must be adjusted can be selected.

When the operation point 1 is selected in such a manner that a range in which the elements A1, B1, C1 and D1 of the beam matrix indicating one reciprocating motion of the optical resonator A satisfy the following relationship:

$$-0.99 < (A1+D1)/2 < 0.99 \qquad (10)$$

that is, the operation point 1 is selected in a range in which the following range is satisfied:

$$0.005 < (1-(L3+L4)/F1-L4/F2+L3\ L4/(F1\ F2)-L0/R1a)(1-(L1a+L3)/F2-L1a/F1+L1a\ L3/(F1\ F2)-L0/R2a) < 0.995 \qquad (11)$$

Then, in accordance with the selected operation point 1, A2 and D2 are determined. Thus, the optical resonator B which is capable of stably oscillating at the operation point 2 can be designed. In place of satisfying the relationship in equation (6), each of −1<(A1+D1)/2<1 may independently be satisfied. The foregoing fact also applied to equation (8).

As described above, the solid-state laser apparatus according to this embodiment has the structure that the optical resonator is formed into a stable resonator by the reflecting mirror 4a, the solid-state laser medium 3a, the thermal lens F1 in the solid-state laser medium, the wavelength-converting device 17, the thermal lens F2 generated in the wavelength-converting device and the harmonic mirror 19. Therefore, even if a thermal lens is generated in the wavelength-converting device or the like other than the solid-state laser medium in the optical resonator, high-power harmonic laser beams can stably be generated.

The optical resonator of the solid-state laser apparatus according to this embodiment is structured such that the optical resonator is formed into a stable resonator by the reflecting mirror 4a, the solid-state laser medium 3a, the thermal lens F1 in the solid-state laser medium, the wavelength-converting device 17, the thermal lens F2 generated in the wavelength-converting device and the harmonic mirror 19. Therefore, even if a thermal lens is generated in the wavelength-converting device or the like other than the solid-state laser medium because of a factor other than exciting light, an optical resonator of a solid-state laser apparatus can be designed which is capable of efficiently and stably generating high-power laser beams.

Second Embodiment

Figure 3:
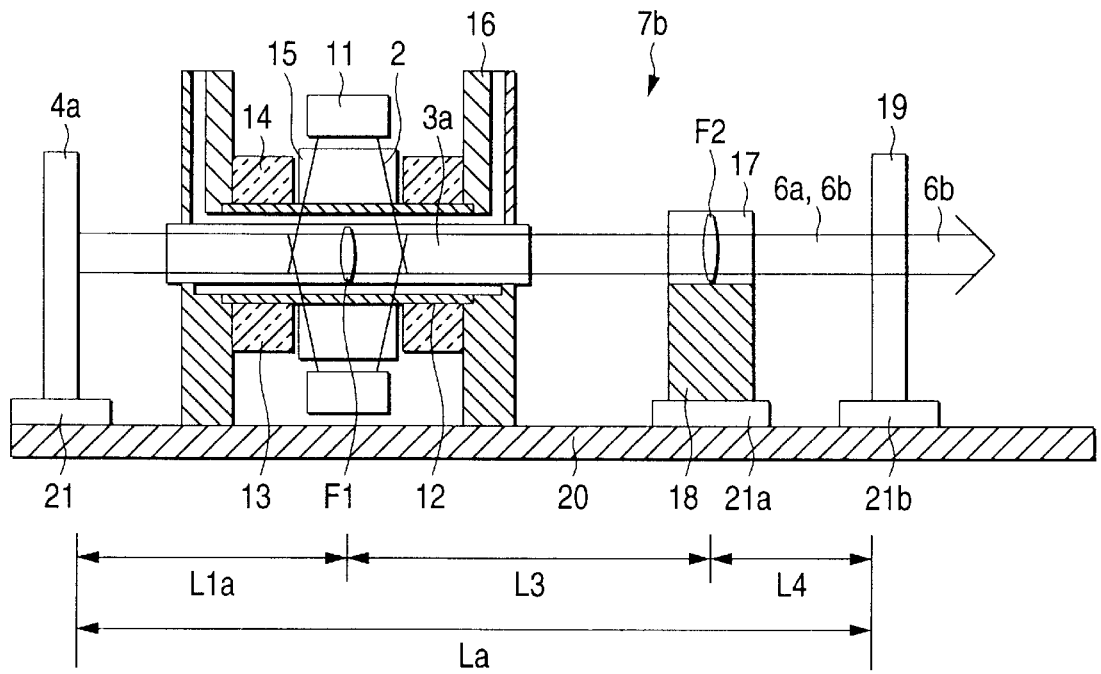
FIG. 3 is a vertical cross sectional view showing the structure of a solid-state laser apparatus according to a second embodiment of the present invention.

FIG. 3 is a vertical cross sectional view showing a solid-state laser apparatus according to a second embodiment of the present invention. Referring to the drawing, reference numerals 2, 6a, 6b, 11, 12, 13, 14, 15, 16, 18 and 20 represent the same elements as those of the solid-state laser apparatus according to the first embodiment. Reference numeral 7b represents an optical resonator, and 21, 21a and 21b represent resonator-length adjustment means. The optical resonator 7b incorporates a reflecting mirror 4a, a solid-state laser medium 3a, a thermal lens F1 in a solid-state laser medium, a wavelength-converting device 17, a thermal lens F2 in the wavelength-converting device 17 and a harmonic mirror 19. The resonator-length adjustment means 21, 21a and 21b move the reflecting mirror 4a, the wavelength-converting device 17 and the harmonic mirror 19 so as to adjust the resonator length La. Thus, a stable resonator is constituted. That is, assumptions are made that the curvature radius of the reflecting mirror 4a is R1a and the curvature radius of the harmonic mirror 19 is R2a and the following relationship is satisfied:

$$L0=L1a+L3+L4-L1a(L3+L4)/F1-L4(L1a+L3)/F2+L1a\ L3\ L4/(F1\ F2) \qquad (12)$$

The resonator length La is adjusted to satisfy the following relationship:

$$0<(1-(L3+L4)/F1-L4/F2+L3\ L4/(F1\ F2)-L0/R1a)(1-(L1a+L3)/F2-L1a/F1+L1a\ L3/(F1\ F2)-L0/R2a)<1 \qquad (13)$$

Thus, a stable resonator is constituted.

An example of a method of adjusting the resonator length La will now be described. The method of designing a resonator according to the first embodiment is employed to obtain dL1a, dL3 and dL4 with respect to an arbitrary operation point 2. Then, the distance between the devices is changed by dL1a, dL3 and dL4 with respect to an output of exciting light 2 for operating the solid-state laser apparatus so as to adjust the resonator length La.

The solid-state laser apparatus structured as described above is arranged in such a manner that the resonator length La is adjusted in accordance with the thermal lens F1 generated in the solid-state laser medium 3a which is changed by dint of an output of exciting light 2 and the thermal lens F2 generated in the wavelength-converting device 17 which is changed by power of the laser beam which reciprocates in the optical resonator. Thus, the optical resonator is formed into a stable resonator consisting of the reflecting mirror 4a, the solid-state laser medium 3a, the thermal lens F1 in the solid-state laser medium, the wavelength-converting device 17, the thermal lens F2 generated in the wavelength-converting device 17 and the harmonic mirror 19 regardless of the output of exciting light source. Therefore, even if a thermal lens is generated in the wavelength-converting device in the optical resonator, high-power harmonic laser beam can stably be generated regardless of an output of the exciting light source.

Third Embodiment

Figure 4:
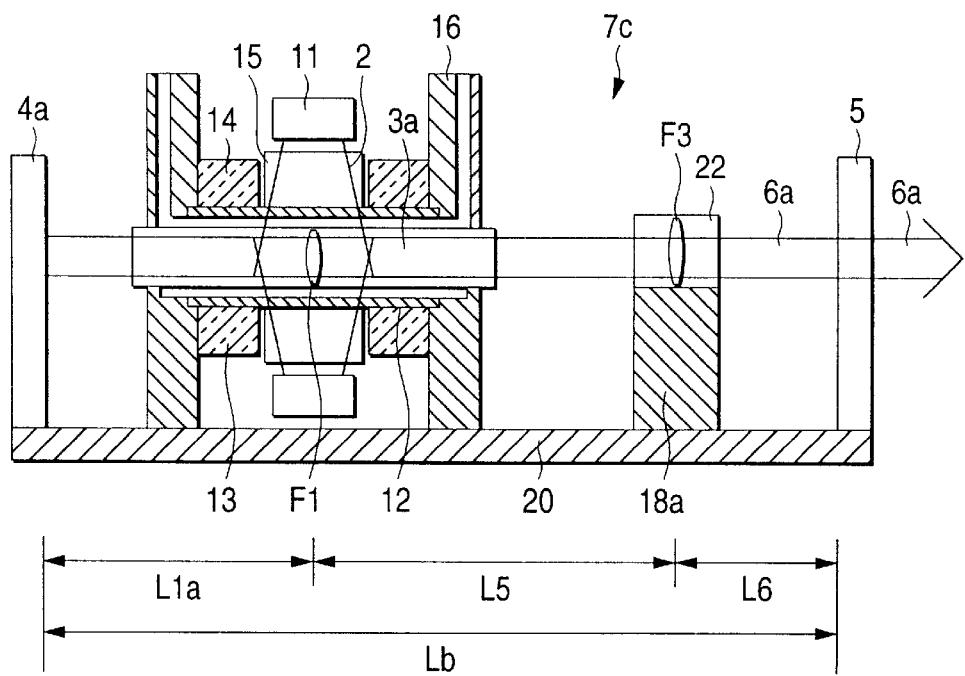
FIG. 4 is a vertical cross sectional view showing the structure of a solid-state laser apparatus according to a third embodiment of the present invention.

FIG. 4 is a vertical cross sectional view showing a solid-state laser apparatus according to a third embodiment of the present invention. Referring to the drawings, reference numerals 2, 6a, 11, 12, 13, 14, 15, 16 and 20 represent the same elements as those of the solid-state laser apparatus according to the first embodiment. Reference numeral 22 represents a transmission optical device, such as a Q switch device, a polarizing device, a lens or an optical substrate. Reference numeral 18a represents a cooling unit for cooling the transmission optical device 22. Reference numeral 5 represents a partial reflecting mirror for reflecting a portion of laser beams and permitting transmission of the residual laser beams. Reference numeral 7c represents an optical resonator. Symbol Lb represents a length of the resonator, L1a represents a distance from the reflecting mirror 4a to the solid-state laser medium 3a, L5 represents a distance from the solid-state laser medium 3a to the transmission optical device 22 and L6 represents a distance from the transmission optical device 22 to the partial reflecting mirror 5. Symbol F1 represents a focal distance of a thermal lens generated in the laser beam and F3 represents a focal distance of a thermal lens generated in the transmission optical device.

The optical resonator 7c is formed into a stable resonator by the reflecting mirror 4a, the solid-state laser medium 3a, the thermal lens F1 in the solid-state laser medium, the transmission optical device 22, the thermal lens F3 generated in the transmission optical device 22 and the partial reflecting mirror 5. That is, assumptions are made that the curvature radius of the reflecting mirror 4a is R1a, the curvature radius of the partial reflecting mirror 5 is R2 and the following relationship is satisfied:

$$L0a=L1a+L5+L6-L1a(L5+L6)/F1-L6(L1a+L5)/F3+L1a\ L5\ L6/(F1\ F3) \quad (14)$$

The structure is arranged to satisfy the following stabilizing condition for a resonator:

$$0<(1-(L5+L6)/F1-L6/F3+L5\ L6/(F1\ F3)-L0a/R1a)(1-(L1a+L5)/F3-L1a/F1+L1a\ L5/(F1\ F3)-L0a/R2)<1 \quad (15)$$

In the semiconductor laser exciting solid-state laser apparatus structured as described above, naturally emitted light generated by the excited solid-state laser medium is amplified during reciprocation of light in the optical resonator 7b so that light is converted into the fundamental-wave laser beam having satisfactory directivity. When the intensity of the fundamental-wave laser beam 6a exceeds a predetermined level, it is extracted to the outside from the partial reflecting mirror 5.

A portion of the fundamental-wave laser beam 6a which reciprocates in the optical resonator is absorbed by the transmission optical device 22 so that the portion is converted into heat. The transmission optical device 22 heated with the foregoing heat is cooled by the cooling unit 18a disposed adjacently. As a result, temperature distribution is generated in the transmission optical device 22 such that the temperatures in the vicinity of the central portion are high and those adjacent to the side surfaces are low. Since change in the refractive indexes of the transmission optical device 22 are substantially in proportion to the temperatures, the temperature distribution generated in the transmission optical device 22 generates distribution of refractive indexes in the transmission optical device 22. As a result, a thermal lens F3 is generated.

With reference to FIG. 2 showing the relationship between outputs of the exciting light source and gauss beam diameters at an end of the solid-state laser medium, a method of designing the optical resonator will now be described. Referring to the drawing, a dashed line shows a case (a optical resonator A) when the distance from the reflecting mirror 4a to the solid-state laser medium 3a is L1a, the distance from the solid-state laser medium 3a to the transmission optical device 22 is L5 and the distance from the transmission optical device 22 to the partial reflecting mirror 5 is L6. A solid lines shows a case (an optical resonator B) when the distance from the reflecting mirror 4a to the solid-state laser medium 3a is L1a+dL1a, the distance from the solid-state laser medium 3a to the transmission optical device 22 is L5+dL5 and the distance from the transmission optical device 22 to the partial reflecting mirror 5 is L6+dL6. An assumption is made that the focal distance of a thermal lens generated in the solid-state laser medium is F1 and the focal distance of a thermal lens generated in the transmission optical device 22 is F3 with respect to an output of the exciting light source at an illustrated operation point 1. Another assumption is made that the focal distance of a thermal lens generated in the solid-state laser medium is F1+dF1 and the focal distance of a thermal lens generated in the transmission optical device 22 is F3+dF3 with respect to an output of the exciting light source at an illustrated operation point 2. In the case of the optical resonator A, the diameter of the gauss beam at the end of the solid-state laser medium exists as a finite value at the operation point 1. Therefore, the stabilizing condition for a resonator can be satisfied. However, at the operation point 2, the diameter of the gauss beam at the end of the solid-state laser medium does not exist as a finite value. Therefore, the stabilizing condition for a resonator cannot be satisfied. The optical resonator B having the diameter of the gauss beam at the end of the solid-state laser medium exists as a finite value and satisfying the stabilizing condition for the resonator can be designed by setting dL1a, dL5 and dL6 in such a manner that the following relationship is satisfied from beam matrix elements A1, B1, C1 and D1 indicating one reciprocating motion at an output of the exciting light source at the operation point 1 which satisfies the stabilizing condition for the optical resonator A and beam matrix elements A2, B2, C2 and D2 indicating one reciprocating motion at an output of the exciting light source at the operation point 2 of the optical resonator B:

$$(A2+D2)/2=(A1+D1)/2 \quad (16)$$

That is, also dL1a, dL5 and dL6 are set in such a manner that the following relationship is satisfied:

$$((dF1\ dF3\ dL1a\ F1\ F3\ L1a+dF1\ dF3\ dL5\ F1\ F3\ L5-dF3\ dL1a$$
$$dL5\ F3\ L1a\ L5+d\ F1\ dF3\ dL6\ F1\ F3\ L6-dF1\ dL1a\ dL6\ F1$$
$$L1a\ L6-dF3$$

$$dL1a\ dL6\ F3\ L1a\ L6-dF1\ dL5\ dL6\ F1\ L5\ L6+dL1a\ dL5\ dL6\ L1a$$
$$L5\ L6-dF1\ dF3\ F1\ F3\ R1a+dF3\ dL5\ F3\ L5\ R1a+dF1\ dL6\ F1$$
$$L6\ R1a+dF3\ dL6$$

$$F3\ L6\ R1a-dL5\ dL6\ L5\ L6\ R1a)(dF1\ dF3\ dL1a\ F1\ F3\ L1a+dF1$$
$$dF3\ dL5\ F1\ F3\ L5-dF3\ dL1a\ dL5\ F3\ L1a\ L5+dF1\ dF3\ dL6$$
$$F1\ F3\ L6-dF1\ dL1a$$

$$dL6\ F1\ L1a\ L6-dF3\ dL1a\ dL6\ F3\ L1a\ L6-dF1\ dL5\ dL6\ F1\ L5$$
$$L6+dL1a\ dL5\ dL6\ L1a\ L5\ L6-dF1\ dF3\ F1\ F3\ R2+dF1\ dL1a$$
$$F1\ L1a\ R2+dF3\ dL1a$$

$$F3\ L1a\ R2+dF1\ dL5\ F1\ L5\ R2-dL1a\ dL5\ L1a\ L5\ R2))/(dF1\hat{\ }2$$
$$dF3\hat{\ }2$$

$$F1\hat{\ }2\ F3\hat{\ }2\ R1a\ R2)=((F1\ F3\ L1a+F1\ F3\ L5-F3\ L1a\ LS+F1\ F3$$
$$L6-F1$$

$$L1a\ L6-F3\ L1a\ L6-F1\ LS\ L6+L1a\ L5\ L6-F1\ F3\ R1a+F3\ L5$$
$$R1a+F1\ L6$$

$$R1a+F3\ L6\ R1a-L5\ L6\ R1a)(F1\ F3\ L1a+F1\ F3\ L5-F3\ L1a$$
$$L5+F1\ F3\ L6-F1\ L1a\ L6-F3\ L1a\ L6-F1\ L5\ L6+L1a\ L5$$
$$L6-F1\ F3$$

$$R2+F1\ L1a\ R2+F3\ L1a\ R2+F1\ L5\ R2-L1a\ L5\ R2))/(F1\hat{\ }2\ F3\hat{\ }2$$
$$R1a\ R2) \quad (17)$$

When dL1a, dL5 and dL6 are set to satisfy the following relationship:

$$(A2+D2)/2=-(A1+D1)/2 \quad (18)$$

Thus, the optical resonator B can be designed. That is, when dL1a, dL5 and dL6 are set in such a manner that the following relationship is satisfied, the optical resonator B can be designed:

$$((dF1\ dF3\ dL1a\ F1\ F3\ L1a+dF1\ dF3\ dL5\ F1\ F3\ L5-dF3\ dL1a$$

$$dL5\ F3\ L1a\ L5+d\ F1\ dF3\ dL6\ F1\ F3\ L6-dF1\ dL1a\ dL6\ F1\ L1a$$
$$L6-dF3$$

$$dL1a\ dL6\ F3\ L1a\ L6-dF1\ dL5\ dL5\ F1\ L5\ L6+dL1a\ dL5\ dL6\ L1a$$
$$L5$$

$L6-dF1\ dF3\ F1\ F3\ R1a+dF3\ dL5\ F3\ L5\ R1a+dF1\ dL6\ F1\ L6\ R1a+dF3$ $dL6\ F3\ L6\ R1a-dL5\ dL6\ L5\ L6\ R1a)(dF1\ dF3\ dL1a\ F1\ F3\ L1a+dF1\ dF3$ $dL5\ F1\ F3\ L5-dF3\ dL1a\ dL5\ F3\ L1a\ L5+dF1\ dF3\ dL6\ F1\ F3\ L6-dF1$ $dL1a\ dL6\ F1\ L1a\ L5-dF3\ dL1a\ dL6\ F3\ L1a\ L6-dF1\ dL5\ dL6\ F1\ L5$ $L6+dL1a\ dL5\ dL6\ L1a\ L5\ L6-dF1\ dF3\ F1\ F3\ R2+dF1\ dL1a\ F1\ L1a$ $R2+dF3\ dL1a\ F3\ L1a\ R2+dF1\ dL5\ F1\ L5\ R2-dL1a\ dL5\ L1a\ L5$ $R2))/(dF1\hat{}2\ dF3\hat{}2\ F1\hat{}2\ F3\hat{}2\ R1a\ R2)=((-(F1\ F3\ L1a)-F1\ F3$ $L5+F3\ L1a\ L5-F1\ F3\ L6+F1\ L1a\ L6+F3\ L1a\ L6+F1\ L5\ L6-L1a\ L5$ $L6)(F1\ F3\ L1a+F1\ F3\ L5-F3\ L1a\ L5+F1\ F3\ L6-F1\ L1a\ L6-F3\ L1a\ L6-$ $F1\ L5\ L6+L1a\ L5\ L6-F1\ F3\ R1a+F3\ L5\ R1a+F1\ L6\ R1a+F3\ L6\ R1a-L5$ $L6\ R1a-F1\ F3\ R2+F1\ L1a\ R2+F3\ L1a\ R2+F1\ L5\ R2-L1a\ L5\ R2-F1\ R1a$ $$R2-F3\ R1a\ R2+L5\ R1a\ R2))/(F1\hat{}2\ F3\hat{}2\ R1a\ R2) \quad (19)$$

When the operation point 1 is selected in such a manner that a range in which the elements A1, B1, C1 and D1 of the beam matrix indicating one reciprocating motion of the optical resonator A satisfies the following relationship:

$$-0.99<(A1+D1)/2<0.99 \quad (20)$$

that is, the operation point 1 is selected in a range in which the following range is satisfied:

$$005<(1-(L5+L6)/F1-L6/F3+L5\ L6/(F1\ F3)-L0/R1a)(1-(L1a+L5)/F3-L1a/F1+L1a\ L5/(F1\ F3)-L0/R2a)<0.99S \quad (21)$$

Then, in accordance with the selected operation point 1, A2 and D2 are determined. Thus, the optical resonator B which is capable of stably oscillating at the operation point 2 can be designed. In place of satisfying the relationship in equation (16), each of $-1<(A1+D1)<1$ and $-1<(A2+D2)/2<1$ may independently be satisfied. The foregoing fact also applied to equation (18).

As described above, the solid-state laser apparatus according to this embodiment has the structure that the optical resonator is formed into a stable resonator by the reflecting mirror 4a, the solid-state laser medium 3a, the thermal lens F1 in the solid-state laser medium, the transmission optical device 22, the thermal lens F3 generated in the transmission optical device 22 and the partial reflecting mirror 5. Therefore, even if a thermal lens is generated in the transmission optical device in the optical resonator, high-power fundamental laser beams can stably be generated.

The method of designing an optical resonator of the solid-state laser apparatus according to this embodiment is structured such that the optical resonator is formed into a stable resonator by the reflecting mirror 4a, the solid-state laser medium 3a, the thermal lens F1 in the solid-state laser medium, the transmission optical device 22, the thermal lens F3 generated in the transmission optical device 22 and the partial reflecting mirror 5. Therefore, even if a thermal lens is generated in the transmission optical device or the like other than the solid-state laser medium because of a factor other than exciting light, an optical resonator of a solid-state laser apparatus can be designed which is capable of efficiently and stably generating high-power laser beams.

Fourth Embodiment

Figure 5:
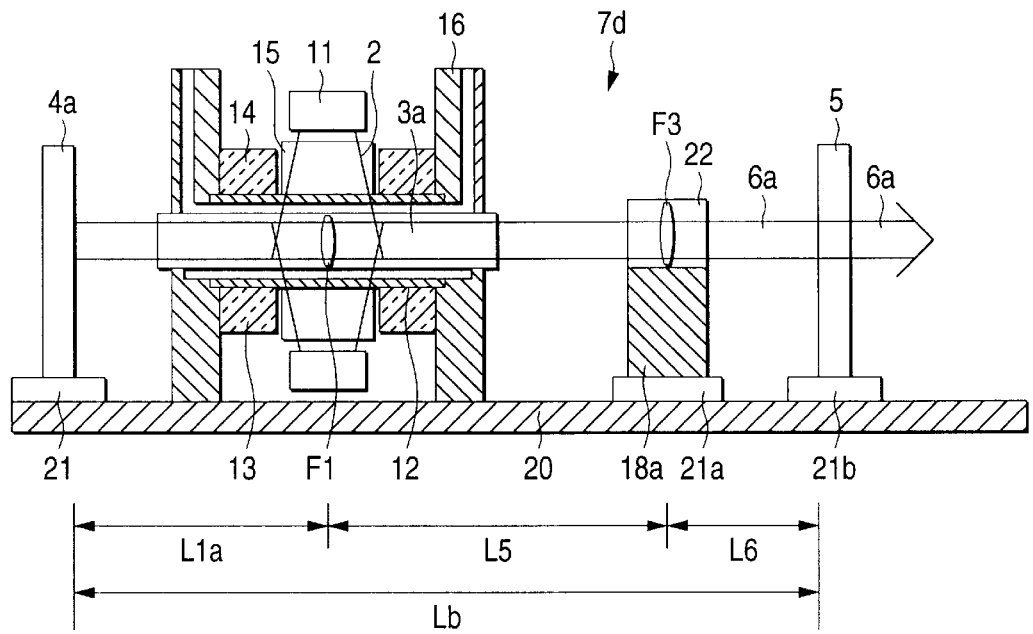
FIG. 5 is a vertical cross sectional view showing the structure of a solid-state laser apparatus according to a fourth embodiment of the present invention.

FIG. 5 is a vertical cross sectional view showing a solid-state laser apparatus according to a fourth embodiment of the present invention. Referring to the drawing, reference numerals 2, 6a, 11, 12, 13, 14, 15, 16, 18a and 20 represent the same elements as those of the solid-state laser apparatus according to the third embodiment. Reference numerals 21, 21a and 21b represent resonator-length adjustment means for adjusting the resonator length Lb. The optical resonator 7d incorporates a reflecting mirror 4a, a solid-state laser medium 3a, a thermal lens F1 in the solid-state laser medium, a transmission optical device 22, a thermal lens F3 generated in the transmission optical device 22 and a partial reflecting mirror 5. The resonator-length adjustment means 21 moves the partial reflecting mirror 5 so as to adjust the resonator length Lb. Thus, a stable resonator is constituted. That is, assumptions are made that the curvature radius of the reflecting mirror 4a is R1a and the curvature radius of the partial reflecting mirror 5 is R2 and the following relationship is satisfied:

$$L0a=L1a+L5+L6-L1a(L5+L6)/F1-L6(L1a+L5)/F3+L1a\ L5\ L6/(F1\ F3) \quad (22)$$

The resonator length Lb is adjusted to satisfy the following relationship which is the stabilizing condition for a resonator:

$$0<(1-(L5+L6)/F1-L6/F3+L5\ L6/(F1\ F3)-L0a/R1a)(1-(L1a+L5)/F3-L1a/F1+L1a\ L5/(F1\ F3)-L0a/R2)<1 \quad (23)$$

Thus, a stable resonator is constituted.

An example of a method of adjusting the resonator length Lb will now be described. The method of designing a resonator according to the third embodiment is employed to obtain dL1a, dL5 and dL6 with respect to an arbitrary operation point 2. Then, the distance between the devices is changed by dL1a, dL5 and dL6 with respect to an output of exciting light 2 for operating the solid-state laser apparatus so as to adjust the resonator length Lb.

The solid-state laser apparatus structured as described above is arranged in such a manner that the resonator length Lb is adjusted in accordance with the thermal lens F1 generated in the solid-state laser medium 3a which is changed by dint of an output of exciting light 2 and the thermal lens F2 generated in the transmission optical device 22 which is changed by power of the laser beam which reciprocates in the optical resonator 7d. Thus, the optical resonator is formed into a stable resonator consisting of the reflecting mirror 4a, the solid-state laser medium 3a, the thermal lens F1 in the solid-state laser medium, the transmission optical device 22, the thermal lens F3 generated in the transmission optical device 22 and the partial reflecting mirror 5. Therefore, even if a thermal lens is generated in the transmission optical device in the optical resonator, high-power harmonic laser beam can stably be generated regardless of an output from the exciting light source.

Fifth Embodiment

Figure 6:
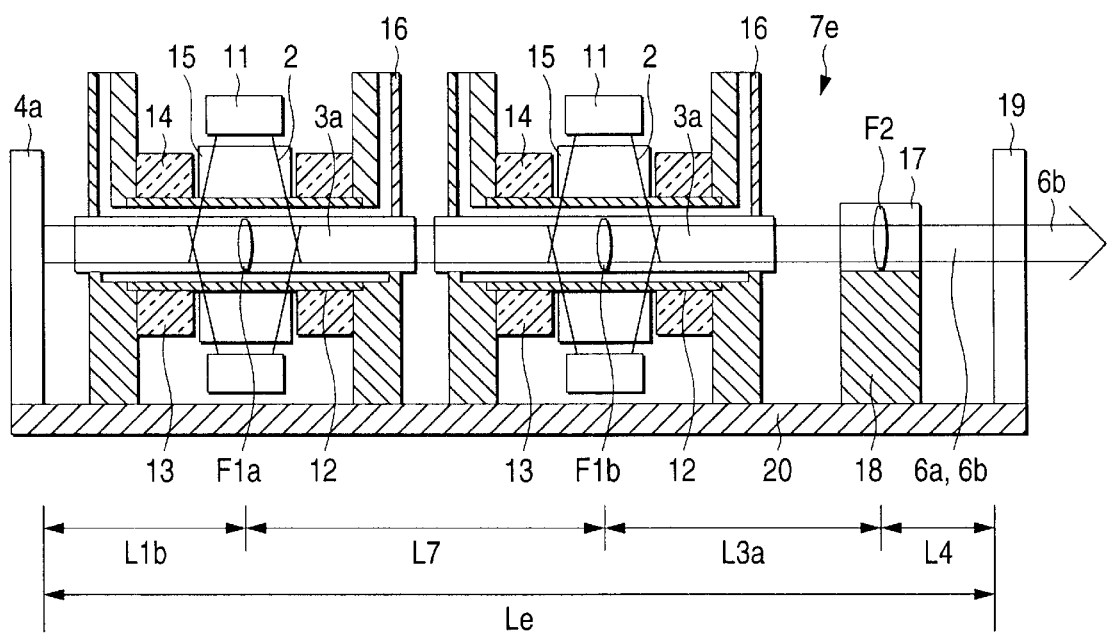
FIG. 6 is a vertical cross sectional view showing the structure of a solid-state laser apparatus according to a fifth embodiment of the present invention.

FIG. 6 is a vertical cross sectional view showing a solid-state laser apparatus according to a fifth embodiment of the present invention. Referring to the drawings, reference numerals 2, 6a, 6b, 11, 12, 13, 14, 15, 16, 18 and 20 represent the same elements as those of the solid-state laser apparatus according to the first embodiment. Reference numeral 3a represents the solid-state laser medium containing a first active solid-state laser medium, 3b represents a solid-state laser medium containing a second active solid-state laser medium and 7e represents an optical resonator. Symbol Le represents resonator length, L1b represents a distance from the reflecting mirror 4a to the first solid-state laser medium 3a, L3a represents a distance from the second solid-state laser medium 3a and the wavelength-converting device 17, L4 represents a distance from the wavelength-converting device 17 to the harmonic mirror 19 and L7 represents a distance from the first solid-state laser medium 3a to the second solid-state laser medium 3b, Symbol F1a represents a focal distance of a thermal lens generated in the first solid-state laser medium 3a, F1b represents a focal distance of a thermal lens generated in the second solid-state laser medium and F2 represents a focal distance of a thermal lens generated in the wavelength-converting device 17. The optical resonator 7e is formed into a stable resonator by the reflecting mirror 4a, the first solid-state laser medium 3a, the thermal lens F1a in the first solid-state laser medium 3a, the second solid-state laser medium 3b, the thermal lens F1b in the second solid-state laser medium 3b, the wavelength-converting device 17, the thermal lens F2 generating in the wavelength-converting device 17 and the harmonic mirror 19. That is, assumptions are made that the curvature radius of the reflecting mirror 4a is R1a, the curvature radius of the harmonic mirror 19 is R2a and the following relationship is satisfied:

$$L0b=L1b+L3a+L4+L7-L1b(L3a+L4+L7)/F1a-(L1b+L7)$$

$$(L3a+L4)/F1b-L4(L1b+L3a+L7)/F2+L1b\ L7(L3a+L4)/(F1a\ F1b)+L3a$$

$$L4(L1b+L7)/(F1b\ F2)+L1b\ L4(L3a+L7)/(F1a\ F2)-L1b\ L3a\ L4\ L7/(F1a\ F1b\ F2) \tag{24}$$

The structure is arranged to satisfy the following stabilizing condition for a resonator:

$$0<(1-(L3a+L4+L7)/F1a-(L3a+L4)/F1b-L4/F2+L7(L3a+L4)/(F1a\ F1b)+L3a\ L4/(F1b\ F2)+L4(L3a+L7)/(F1a\ F2)L3a\ L4\ L7/(F1a$$

$$F1b\ F2)-L0b/R1a)(1-(L1b+L3a+L7)/F2-(L1b+L7)/F1b-L1b/F1a+L1b$$

$$L7/(F1a\ F1b)+L3a(L1b+L7)/(F1b\ F2)+L1b(L3a+L7)/(F1a\ F2)-L1b\ L3a\ L7/(F1a\ F1b\ F2)-L0b/R2a)<1 \tag{25}$$

A component of exciting light 2 which has been absorbed by the solid-state laser medium 3a and the second solid-state laser medium 3b and which has not been converted into the fundamental-wave laser beam 6a is converted into heat. The solid-state laser medium 3a and the second solid-state laser medium 3b heated with the foregoing heat is cooled by the cooling medium which flows in the flow tube 14 disposed adjacently. As a result, temperature distribution takes place in which the temperatures in the vicinity of the central portion are high and temperatures in the vicinity of the side surfaces are low. Since change in the refractive index of the solid-state laser medium 3a and the second solid-state laser medium 3b is substantially in proportion to the temperature, the temperature distribution generated in each of the solid-state laser medium 3a and the second solid-state laser medium 3b causes the refractive indexes to be varied in the solid-state laser medium 3a and the second solid-state laser medium 3. Thus, the thermal lenses F1a and F1b are generated.

With reference to FIG. 2 showing the relationship between outputs of the exciting light source and gauss beam diameters at an end of the solid-state laser medium, a method of designing the optical resonator will now be described. Referring to the drawing, a dashed line shows a case (a optical resonator A) when the distance from the reflecting mirror 4a to the first solid-state laser medium 3a is L1b, the distance from the second solid-state laser medium 3b to the wavelength-converting device 17 is L3a, the distance from the wavelength-converting device to the harmonic mirror is L4 and the distance from the first solid-state laser medium 3a to the second solid-state laser medium 3b is L7. A solid lines shows a case (an optical resonator B) when the distance the distance from the reflecting mirror 4a to the first solid-state laser medium 3a is L1b+dL1b, the distance from the second solid-state laser medium 3b to the wavelength-converting device 17 is L3a+dL3a, the distance from the wavelength-converting device to the harmonic mirror is L4+dL4 and the distance from the first solid-state laser medium 3a to the second solid-state laser medium 3b is L7+dL7. The focal distance of a thermal lens generated in the first solid-state laser medium is F1a, the focal distance of a thermal lens generated in the second solid-state laser medium is F1b and the focal distance of a thermal lens generated in the wavelength-converting device is F2 with respect to an output of the exciting light source at an illustrated operation point 1. Another assumption is made that the focal distance of a thermal lens generated in the first solid-state laser medium is F1a+dF1a, the focal distance of a thermal lens generated in the second solid-state laser medium is F1b+dF1b and the focal distance of a thermal lens generated in the wavelength-converting device is F2+dF2 with respect to an output of the exciting light source at an illustrated operation point 2.

In the case of the optical resonator A, the diameter of the gauss beam at the end of the solid-state laser medium exists as a finite value at the operation point 1. Therefore, the stabilizing condition for a resonator can be satisfied. However, at the operation point 2, the diameter of the gauss beam at the end of the solid-state laser medium does not exist as a finite value. Therefore, the stabilizing condition for a resonator cannot be satisfied. The optical resonator B having the diameter of the gauss beam at the end of the solid-state laser medium exists as a finite value and satisfying the stabilizing condition for the resonator can be designed by setting dL1b, dL3a, dL4 and dL7 in such a manner that the following relationship is satisfied from beam matrix elements A1, B1, C1 and D1 indicating one reciprocating motion at an output of the exciting light source at the operation point 1 which satisfies the stabilizing condition for the optical resonator A and beam matrix elements A2, B2, C2 and D2 indicating one reciprocating motion at an output of the exciting light source at the operation point 2 of the optical resonator B:

$$(A2+D2)/2=(A1+D1)/2 \tag{26}$$

That is, dL1b, dL3a, dL4 and dL7 are set in such a manner that the following relationship is satisfied:

$$((dF1a\ dF1b\ dF2\ dL1b\ F1a\ F1b\ F2\ L1b+dF1a\ dF1b\ dF2\ dL3a\ F1a\ F1b\ F2\ L3a-dF1a\ dF2\ dL1b\ dL3a\ F1a\ F2\ L$$

$$1b\ L3a-dF1b\ dF2\ dL1b\ dL3a\ F1b\ F2\ L1b\ L3a+dF1a\ dF1b\ dF2\ dL4\ F1a\ F1b\ F2\ L4-dF1a\ dF1b$$

$$dL1b\ dL4\ F1a\ F1b\ L1b\ L4-dF1a\ dF2\ d\ L1b\ dL4\ F1a\ F2\ L1b\ L4-dF1b$$

$$dF2\ dL1b\ dL4\ F1b\ F2\ L1b\ L4-dF1a\ dF1b\ dL3a\ dL4\ F1a\ F1b\ L3a$$

$$L4+dF1a\ dL1b\ dL3a\ dL4\ F1a\ L1b\ L3a\ L4+dF1b\ dL1b\ dL3a\ dL4\ F1b\ L1b$$

$$L3a\ L4+dF1a\ dF1b\ dF2\ dL7\ F1a\ F1b\ F2\ L7-dF1b\ dF2\ dL1b\ dL7\ F1b\ F2$$

L1b L7−dF1a dF2 dL3a dL7 F1a F2 L3a L7+dF2 dL1b dL3a dL7 F2 L1b

L3a L7−dF1a dF1b dL4 dL7 F1a F1b L4 L7−dF1a dF2 dL4 dL7 F1a F2

L4 L7+dF1b dL1b dL4 dL7 F1b L1b L4 L7+dF2 dL1b dL4 dL7 F2 L1b

L4 L7+dF1a dL3a dL4 dL7 F1a L3a L4 L7−dL1b dL3a dL4 dL7 L1b L3a

L4 L7−dF1a dF1b dF2 F1a F1b F2 R1a+dF1a dF2 dL3a F1a F2 L3a

R1a+dF1b dF2 dL3a F1b F2 L3a R1a+dF1a dF1b dL4 F1a F1b L4

R1a+dF1a dF2 dL4 F1a F2 L4 R1a+dF1b dF2 dL4 F1b F2 L4 R1a−dF1a dL3a dL4 F1a L3a L4 R1a−dF1b dL3a dL4 F1b L3a L4 R1a+ dF1b dF2 dL7 F1b F2 L7 R1a−dF2 dL3a dL7 F2 L3a L7 R1a−dF1b dL4 dL7 F1b

L4 L7 R1a−dF2 dL4 dL7 F2 L4 L7 R1a+dL3a dL4 dL7 L3a L4 L7

R1a)(dF1a dF1b dF2 dL1b F1a F1b F2 L1b+dF1a dF1b dF2 dL3a F1a

F1b F2 L3a−dF1a dF2 dL1b dL3a F1a F2 L1b L3a−dF1b dF2 dL1b dL3a

F1b F2 L1b L3a+dF1a dF1b dF2 dL4 F1a F1b F2 L4−dF1a dF1b dL1b dL4 F1a F1b L1b L4−dF1a dF2 dL1b dL4 F1a F2 L1b L4−dF1b dF2 dL1b dL4 F1b F2 L1b L4−dF1a dF1b dL3a dL4 F1a F1b L3a L4+dF1a dL1b dL3a dL4 F1a L1b L3a L4+dF1b dL1b dL3a dL4 F1b L1b L3a

L4+dF1a dF1b dF2 dL7 F1a F1b F2 L7−dF1b dF2 dL1b dL7 F1b F2 L1b

L7−dF1a dF2 dL3a dL7 F1a F2 L3a Lb+dF2 dL1b dL3a dL7 F2 L1b L3a

L7−dF1a dF1b dL4 dL7 F1a F1b L4 L7−dF1a dF2 dL4 dL7 F1a F2 L4

L7+dF1b dL1b dL4 dL7 F1b L1b L4 L7+dF2 dL1b dL4 dL7 F2 L1b L4

L7+dF1a dL3a dL4 dL7 F1a L3a L4 L7−dL1b dL3a dL4 dL7 L1b L3a L4

L7−dF1a dF1b dF2 F1a F1b F2 R2a+dF1a dF1b dL1b F1a F1b L1b

R2a+dF1a dF2 dL1b F1a F2 L1b R2a+dF1b dF2 dL1b F1b F2 L1b

R2a+dF1a dF1b dL3a F1a F1b L3a R2a−dF1a dL1b dL3a F1a L1b L3a

R2a−dF1b dL1b dL3a F1b L1b L3a R2a+dF1b dL7 F1a F1b L7

R2a+dF1a dF2 dL7 F1a F2 L7 R2a−dF1b dL1b dL7 F1b L1b L7 R2a−dF2 dL1b dL7 F2 L1b L7 R2a−dF1a dL3a dL7 F1a L3a L7 R2a+dL1b dL3a dL7 L1b L3a L7 R2a))/(dF1a^2 dF1b^2 dF2^2 F1a^2 F1b^2 F2^2 R1a R2a)=((F1a F1b F2 L1b+F1a F1b F2 L3a−F1a F2 L1b L3a−F1b F2

L1b L3a+F1a F1b F2 L4−F1a F1b L1b L4−F1a F2 L1b L4−F1b F2 L1b

L4−F1a F1b L3a L4+F1a L1b L3a L4+F1b L1b L3a L4+F1a F1b F2 L7−

F1b F2 L1b L7−F1a F2 L3a L7+F2 L1b L3a L7−F1a F1b L4 L7−F1a F2

L4 L7+F1b L1b L4 L7+F2 L1b L4 L7+F1a L3a L4 L7−L1b L3a L4 L7−

F1a F1b F2 R1a+F1a F2 L3a R1a+F1b F2 L3a R1a+F1a F1b L4 R1a+F1a

F2 L4 R1a+F1b F2 L4 R1a−F1a L3a L4 R1a−F1b L3a L4 R1a+F1b F2 L

7 R1a−F2 L3a L7 R1a−F1b L4 L7−R1a−F2 L4 L7 R1a+L3a L4 L7

R1a)(F1a F1b F2 L1b+F1a F1b F2 L3a−F1a F2 L1b L3a−F1b F2 L1b

L3a +F1a F1b F2 L4−F1a F1b L1b L4−F1a F2 L1b L4−F1b F2 L1b L4−

F1a F1b L3a L4+F1a L1b L3a L4+F1b L1b L3a L4+F1a F1b F2 L7−F1b

F2 L1b L7−F1a F2 L3a L7+F2 L1b L3a L7−F1a F1b L4 L7−F1a F2 L4

L7+F1b L1b L4 L7+F2 L1b L4 L7+F1a L3a L4 L7−L1b L3a L4 L7−F1a

F1b F2 R2a+F1a F1b L1b R2a+F1a F2 L1b R2a+F1b F2 L1b R2a+F1a F1 b L3a R2a−F1a L1b L3a R2a−F1b L1b L3a R2a+F1a F1b L7 R2a+F1a F2

L7 R2a−F1b L1b L7 R2a−F2 L1b L7 R2a−F1a L3a L7 R2a+L1b L3a L7

R2a))/(F1a^2 F1 b^2 F2^2 R1a R2a) (27)

When dL1b, dL3a, dL4 and dL7 are set to satisfy the following relationship:

(A2+D2)/2=−(A1+D1)/2 (28)

The optical resonator B can be designed. That is, when dL1b, dL3a, dL4 and dL7 are set in such a manner that the following relationship is satisfied, the optical resonator B can be designed:

((dF1a dF1b dF2 dL1b F1a F1b F2 L1b+dF1a dF1b dF2 dL3a

F1a F1b F2 L3a−dF1a dF2 dL1b dL3a F1a F2 L1b L3a−dF1b dF2 dL1b dL3a F1b F2 L1b L3a+dF1a dF1b dF2 dL4 F1a F1b F2 L4−dF1a dF1b dL1b dL4 F1a F1b L1b L4−dF1a dF2 dL1b dL4 F1a F2 L1b L4−dF1b dF2 dL1b dL4 F1b F2 L1b L4−dF1a dF1b dL3a dL4 F1a F1b L3a

L4+dF1a dL1b dL3a dL4 F1a L1b L3a L4+dF1b dL1b dL3a dL4 F1b

L1b L3a L4+dF1a dF1b dF2 dL7 F1a F1b F2 L7−dF1b dF2 dL1b dL7

$F1b\ F2\ L1b\ L7-dF1a\ dF2\ dL3a\ dL7\ F1a\ F2\ L3a\ L7+dF2\ dL1b\ dL3a\ dL7$ $F2\ L1b\ L3a\ L7-dF1a\ dF1b\ dL4\ dL7\ F1a\ F1b\ L4\ L7-dF1a\ dF2\ dL4\ dL7$ $F1a\ F2\ L4\ L7+dF1b\ dL1b\ dL4\ dL7\ F1b\ L1b\ L4\ L7+dF2\ dL1b\ dL4\ dL7$ $F2\ L1b\ L4\ L7+dF1a\ dL3a\ dL4\ dL7\ F1a\ L3a\ L4\ L7-dL1b\ dL3a\ dL4\ dL7$ $L1b\ L3a\ L4\ L7-dF1a\ dF1b\ dF2\ F1a\ F1b\ F2\ R1a+dF1a\ dF2\ dL3a\ F1a\ F2$ $L3a\ R1a+dF1b\ dF2\ dL3a\ F1b\ F2\ L3a\ R1a+dF1a\ dF1b\ dL4\ F1a\ F1b\ L4$ $R1a+dF1a\ dF2\ dL4\ F1a\ F2\ L4\ R1a+dF1b\ dF2\ dL4\ F1b\ F2\ L4\ R1a-dF1a$ $dL3a\ dL4\ F1a\ L3a\ L4\ R1a-dF1b\ dL3a\ dL4\ F1b\ L3a\ L4\ R1a+dF1b\ dF2$ $dL7\ F1b\ F2\ L7\ R1a-dF2\ dL3a\ dL7\ F2\ L3a\ L7\ R1a-dF1b\ dL4\ dL7\ F1b$ $L4\ L7\ R1a-dF2\ dL4\ dL7\ F2\ L4\ L7\ R1a+dL3a\ dL4\ dL7\ L3a\ L4\ L7$ $R1a)(dF1a\ dF1b\ dF2\ dL1b\ F1a\ F1b\ F2\ L1b+dF1a\ dF1b\ dF2\ dL3a\ F1a$ $F1b\ F2\ L3a-dF1a\ dF2\ dL1b\ dL3a\ F1a\ F2\ L1b\ L3a-dF1b\ dF2\ dL1b\ dL3a$ $F1b\ F2\ L1b\ L3a+dF1a\ dF1b\ dF2\ dL4\ F1a\ F1b\ F2\ L4-dF1a\ dF1b\ dL1b$ $dL4\ F1a\ F1b\ L1b\ L4-dF1a\ dF2\ dL1b\ dL4\ F1a\ F2\ L1b\ L4-dF1\ b\ dF2$ $dL1b\ dL4\ F1b\ F2\ L1b\ L4-dF1a\ dF1b\ dL3a\ dL4\ F1a\ F1b\ L3a\ L4+dF1a$ $dL1b\ dL3a\ dL4\ F1a\ L1b\ L3a\ L4+dF1b\ dL1b\ dL3a\ dL4\ F1b\ L1b\ L3a$ $L4+dF1a\ dF1b\ dF2\ dL7\ F1a\ F1b\ F2\ L7-dF1b\ dF2\ dL1b\ dL7\ F1b\ F2\ L1b$ $L7-dF1a\ dF2\ dL3a\ dL7\ F1a\ F2\ L3a\ L7+dF2\ dL1b\ dL3a\ dL7\ F2\ L1b\ L3a$ $L7-dF1a\ dF1b\ dL4\ dL7\ F1a\ F1b\ L4\ L7-dF1a\ dF2\ dL4\ dL7\ F1a\ F2\ L4$ $L7+dF1b\ dL1b\ dL4\ dL7\ F1b\ L1b\ L4\ L7+dF2\ dL1b\ dL4\ dL7\ F2\ L1b\ L4$ $L4+dF1a\ dL3a\ dL4\ dL7\ F1a\ L3a\ L4\ L7-dL1b\ dL3a\ dL4\ dL7\ L1b\ L3a\ L4$ $L7-dF1a\ dF1b\ dF2\ F1a\ F1b\ F2\ R2a+dF1a\ dF1b\ dL1b\ F1a\ F1b\ L1b$ $R2a+dF1a\ dF2\ dL1b\ F1a\ F2\ L1b\ R2a+dF1b\ dF2\ dL1b\ F1b\ F2\ L1b$ $R2a+dF1a\ dF1b\ dL3a\ F1a\ F1b\ L3a\ R2a-dF1a\ dL1b\ dL3a\ F1a\ L1b\ L3a$ $R2a-dF1b\ dL1b\ dL3a\ F1b\ L1b\ L3a\ R2a+dF1a\ dF1b\ dL7\ F1a\ F1b\ L7$ $R2a+dF1a\ dF2\ dL7\ F1a\ F2\ L7\ R2a-dF1b\ dL1b\ dL7\ F1b\ L1b\ L7$ $R2a-dF2$ $dL1b\ dL7\ F2\ L1b\ L7\ R2a-dF1a\ dL3a\ dL7\ F1a\ L3a\ L7\ R2a+dL1b\ dL3a$ $dL7\ L1b\ L3a\ L7\ R2a))/(dF1a^2\ dF1b^2\ dF2^2$ $F1a^2\ F1b^2\ F2^2\ R1a\ R2a)=$ $((-(F1a\ F1b\ F2\ L1b)-F1a\ F1b\ F2\ L3a+F1a\ F2\ L1b\ L3a+F1b$ $F2\ L1b\ L3a-F1a\ F1b\ F2\ L4+F1a\ F1b\ L1b\ L4+F1a\ F2\ L1b\ L4+F1b\ F2$ $L1b\ L4+F1a\ F1b\ L3a\ L4-F1a\ L1b\ L3a\ L4-F1b\ L1b\ L3a\ L4-F1a\ F1b\ F2$ $L7+F1b\ F2\ L1b\ L7+F1a\ F2\ L3a\ L7-F2\ L1b\ L3a\ L7+F1a\ F1b\ L4\ L7+F1a$ $F2\ L4\ L7-F1b\ L1b\ L4\ L7-F2\ L1b\ L4\ L7-F1a\ L3a\ L4\ L7+L1b\ L3a\ L4$ $L7)(F1a\ F1b\ F2\ L1b+F1a\ F1b\ F2\ L3a-F1a\ F2\ L1b\ L3a-F1b\ F2\ L1b$ $L3a+F1a\ F1b\ F2\ L4-F1a\ F1b\ L1b\ L4-F1a\ F2\ L1b\ L4-F1b\ F2\ L1b\ L4-F$ $1a\ F1b\ L3a\ L4+F1a\ L1b\ L3a\ L4+F1b\ L1b\ L3a\ L4+F1a\ F1b\ F2\ L7-F1b$ $F2\ L1b\ L7-F1a\ F2\ L3a\ L7+F2\ L1b\ L3a\ L7-F1a\ F1b\ L4\ L7-F1a\ F2\ L4$ $L7+F1b\ L1b\ L4\ L7+F2\ L1b\ L4\ L7+F1a\ L3a\ L4\ L7-L1b\ L3a\ L4\ L7-F1a$ $F1b\ F2\ R1a+F1a\ F2\ L3a\ R1a+F1b\ F2\ L3a\ R1a+F1a\ F1b\ L4\ R1a+F1a\ F2$ $L4\ R1a+F1b\ F2\ L4\ R1a-F1a\ L3a\ L4\ R1a-F1b\ L3a\ L4\ R1a+F1b\ F2\ L7$ $R1a-F2\ L3a\ L7\ R1a-F1b\ L4\ L7\ R1a-F2\ L4\ L7\ R1a+L3a\ L4\ L7\ R1a-F1a$ $F1b\ F2\ R2a+F1a\ F1b\ L1b\ R2a+F1a\ F2\ L1b\ R2a+F1b\ F2\ L1b\ R2a+F1a$ $F1b\ L3a\ R2a-F1a\ L1b\ L3a\ R2a-F1b\ L1b\ L3a\ R2a+F1a\ F1b\ L7\ R2a+F1a$ $F2\ L7\ R2a-F1b\ L1b\ L7\ R2a-F2\ L1b\ L7\ R2a-F1a\ L3a\ L7\ R2a+L1b\ L3a$ $L7\ R2a-F1a\ F1b\ R1a\ R2a-F1a\ F2\ R1a\ R2a-F1b\ F2\ R1a\ R2a+F1a\ L3a$ $R1a\ R2a+F1b\ L3a\ R1a\ R2a+F1b\ L7\ R1a\ R2a+F2\ L7\ R1a\ R2a-L3a\ L7$ $R1a\ R2a))/(F1a^2\ F1b^2\ F2^2\ R1a\ R2a)$  (29)

When the operation point 1 is selected in such a manner that a range in which the elements A1, B1, C1 and D1 of the beam matrix indicating one reciprocating motion of the optical resonator A satisfy the following relationship:

$$-0.99 < (A1+D1)/2 < 0.99 \quad (30)$$

that is, the operation point 1 is selected in a range in which the following range is satisfied:

$$0.005 < (1-(L3a+L4+L7)/F1a-(L3a+L4)/F1b-L4/F2+L7(L3a+L4)/(F1a\ F1b)+L3a\ L4/(F1b\ F2)+L4(L3a+L7)/(F1a$$

$$F2)-L3a\ L4\ L7/(F1a\ F1b\ F2)-L0b/R1a)(1-(L1b+L3a+L7)/F2-$$

$$(L1b+L7)/F1b-L1b/F1a+L1b\ L7/(F1a\ F1b)+L3a(L1b+L7)/(F1b\ F2)+L1$$

$$b(L3a+L7)/(F1a\ F2)-L1b\ L3a\ L7/(F1a\ F1b\ F2)-L0b/R2a) < 0.9951) \quad (31)$$

Thus, the optical resonator B which is capable of stably oscillating at the operation point 2 can be designed.

As described above, the solid-state laser apparatus according to this embodiment has the structure that the optical resonator is formed into a stable resonator by the reflecting mirror 4a, the first solid-state laser medium 3a, the thermal lens F1a in the first solid-state laser medium, the second solid-state laser medium 3b, the thermal lens F1b in the second solid-state laser medium, the wavelength-converting device 17, the thermal lens F2 generated in the wavelength-converting device 17 and the harmonic mirror 19. Therefore, even if a thermal lens is generated in the wavelength-converting device in the optical resonator, high-power fundamental laser beams can stably be generated.

Since the plurality solid-state laser medium are employed, higher-power harmonic laser beams can be generated as compared with a structure incorporating one solid-state laser medium.

The method of designing an optical resonator of the solid-state laser apparatus according to this embodiment is structured such that the optical resonator is formed into a stable resonator by the reflecting mirror 4a, the first solid-state laser medium 3a, the thermal lens F1a in the first solid-state laser medium, the second solid-state laser medium 3b, the thermal lens F1b in the second solid-state laser medium, the wavelength-converting device 17, the thermal lens F2 generated in the wavelength-converting device 17 and the harmonic mirror 19. Therefore, even if a thermal lens is generated in the wavelength-converting device or the like other than the solid-state laser medium because of a factor other than exciting light, an optical resonator of a solid-state laser apparatus can be designed which is capable of efficiently and stably generating high-power laser beams.

Although the structure according to this embodiment incorporates two solid-state laser mediums, three or more solid-state laser mediums may be employed. The optical resonator may comprise a reflecting mirror, a plurality of solid-state laser mediums, thermal lenses in a plurality of solid-state laser mediums, a wavelength-converting device, a thermal lens generated in the wavelength-converting device and a harmonic mirror. In this case, an effective similar to that obtainable from this embodiment can be obtained.

Sixth Embodiment

Figure 7:
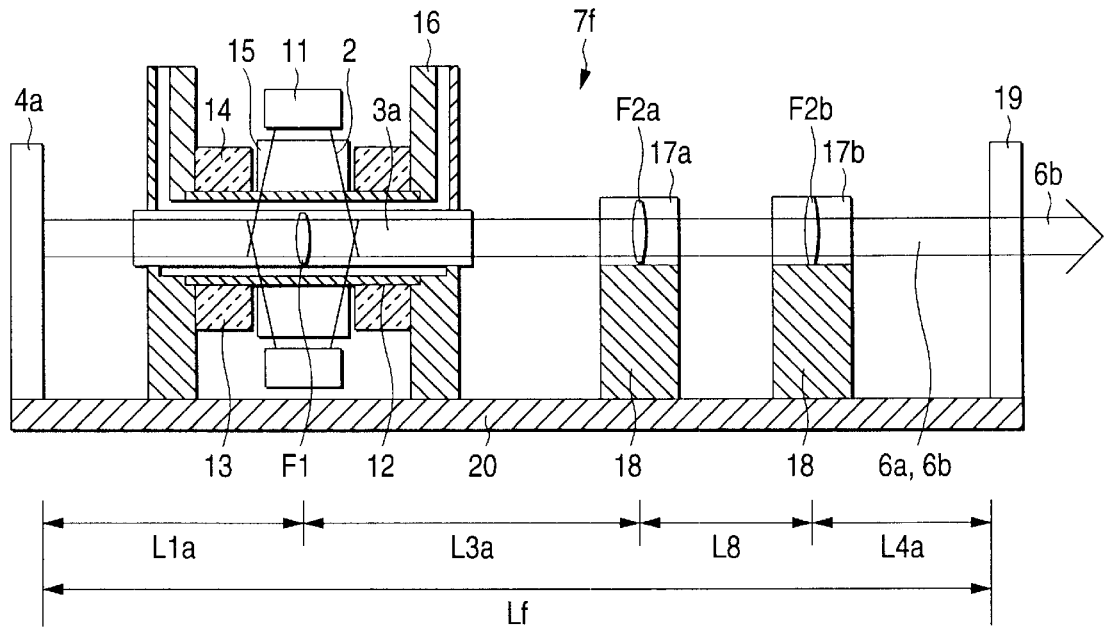
FIG. 7 is a vertical cross sectional view showing the structure of a solid-state laser apparatus according to a sixth embodiment of the present invention.

FIG. 7 is a vertical cross sectional view showing a solid-state laser apparatus according to a sixth embodiment of the present invention. Referring to the drawing, reference numerals 2, 6a, 6b, 11, 12, 13, 14, 15, 16, 18 20 represent the same elements as those of the solid-state laser apparatus according to the first embodiment. Reference numeral 17a represents a first wavelength-converting device, 17b represents a second wavelength-converting device and 7f represents an optical resonator. Symbol Lf represents the length of the resonator, L1a represents a distance from the reflecting mirror 4a to the solid-state laser medium 3a, L3a represents a distance from the solid-state laser medium 3a to the first wavelength-converting device 17a, L4a represents a distance from the second wavelength-converting device 17b to the harmonic mirror 19 and L8 represents a distance from the first wavelength-converting device 17a to the second wavelength-converting device 17b. Symbol F1 represents a focal distance of a thermal lens generated in the solid-state laser medium 3a, F2a represents a focal distance of a thermal lens generated in the first wavelength-converting device 17a and F2b represents a focal distance of a thermal lens generated in the second wavelength-converting device 17b. The optical resonator 7f is formed into a stable resonator by the reflecting mirror 4a, the solid-state laser medium 3a, the thermal lens F1 in the solid-state laser medium, the first wavelength-converting device 17a, the thermal lens F2a in the first wavelength-converting device 17a, the second wavelength-converting device 17b, the thermal lens F2b generated in the second wavelength-converting device 17b and the harmonic mirror 19. That is, assumption is made that the curvature radius of the reflecting mirror 4a is R1a, that of the harmonic mirror 19 is R3 and the following relationship is satisfied:

$$L0c = L1a + L8 + L4a + L3a - L1a(L8+L4a+L3a)/F1 - (L1a+L3a)$$

$$(L8+L4a)/F2a - L4a(L1a+L8+L3a)/F2b + L1a\ L3a(L8+L4a)/(F1\ F2a) + L8$$

$$L4a(L1a+L3a)/(F2a\ F2b) + L1a\ L4a(L8+L3a)/(F1\ F2b) - L1a\ L8\ L4a\ L3a/(F1 - F2a\ F2b) \tag{32}$$

Then, the structure is arranged to satisfy the following stabilizing condition for a resonator:

$$0 < (1 - (L8+L4a+L3a)/F1 - (L8+L4a)/F2a - L4a/F2b + L3a$$

$$(L8+L4a)/(F1\ F2a) + L8\ L4a/(F2a\ F2b) + L4a(L8+L3a)/(F1\ F2b) - L8\ L4a$$

$$L3a/(F1\ F2a\ F2b) - L0c/R1a)(1 - (L1a+L3+L3a)/F2b - (L1a+L3a)/F2a -$$

$$L1a/F1 + L1a\ L3a/(F1\ F2a) + L8(L1a+L3a)/(F2a\ F2b) + L1a(L8+L3a)/(F1\ F2b) - L1a\ L8\ L3a/(F1\ F2a\ F2b) - L0c/R3) < 1 \tag{33}$$

In the solid-state laser apparatus structured as described above, a portion of the fundamental-wave laser beam 6a and the harmonic-wave laser beam 6b are absorbed by the first wavelength-converting device 17a and the second wavelength-converting device 17b so as to be converted into heat. The first wavelength-converting device 17a and the second wavelength-converting device 17b heated with the above-mentioned heat are cooled by the cooling unit disposed adjacently. As a result, distribution of temperatures is generated in the first wavelength-converting device 17a and the 17b such that the temperatures in the vicinity of the central portion are high and those adjacent to the side surfaces are low. Since change in the refractive index in the first wavelength-converting device 17a and the second wavelength-converting device 17b substantially in proportion to the temperatures, the distribution of temperatures generated in the first wavelength-converting device 17a and the second wavelength-converting device 17b causes the refractive indexes to be varied in the first wavelength-converting device 17a and the second wavelength-converting device 17b. Thus, thermal lenses F2a and F2b are generated.

The optical resonator can be designed by the method according to the fifth embodiment.

The solid-state laser apparatus according to this embodiment has the structure that the optical resonator 7f is formed into a stable optical resonator by the reflecting mirror 4a, the solid-state laser medium 3a, the thermal lens F1 in the solid-state laser medium, the first wavelength-converting device 17a, the thermal lens F2a in the first wavelength-converting device, the second wavelength-converting device 17b, the thermal lens F2b generated in the wavelength-converting device 17 and the harmonic mirror 19. Even if thermal lenses are generated in a plurality of the wavelength-converting devices in the optical resonator, high-power harmonic laser beams can stably be generated. Since the plural wavelength-converting devices are employed, higher-power harmonic laser beams can be generated as compared with a structure incorporating one wavelength-converting device.

The method of designing the solid-state laser apparatus according to this embodiment has the structure that the optical resonator 7f is formed into a stable optical resonator by the reflecting mirror 4a, the solid-state laser medium 3a, the thermal lens F1 in the solid-state laser medium, the first wavelength-converting device 17a, the thermal lens F2a in the first wavelength-converting device, the second wavelength-converting device 17b, the thermal lens F2b generated in the wavelength-converting device 17 and the harmonic mirror 19. Therefore, an optical resonator of a solid-state laser apparatus can be designed with which high-power harmonic laser beams can stably be generated even if thermal lenses are generated in a plurality of the wavelength-converting devices other than the solid-state laser medium in the optical resonator because of a factor other than exciting light.

Although this embodiment has the structure incorporating two wavelength-converting devices, three or more wavelength-converting devices may be employed. In this case, the optical resonator can be formed into a stable resonator by the reflecting mirror, the solid-state laser medium, the thermal lens in the solid-state laser medium, the plural wavelength-converting devices, thermal lenses generated in the plural wavelength-converting devices and the harmonic mirror. Thus, an effect similar to that obtainable from the foregoing embodiment can be obtained.

A plurality of solid-state laser mediums and a plurality of wavelength-converting devices may be employed. When the optical resonator is formed into a stable resonator by the reflecting mirror, the plural solid-state laser mediums, the thermal lenses in the plural solid-state laser mediums, the plural wavelength-converting devices, the thermal lenses generated in the plural wavelength-converting devices and the harmonic mirror. Therefore, higher-power harmonic laser beams can stably be generated.

Seventh Embodiment

Figure 8:
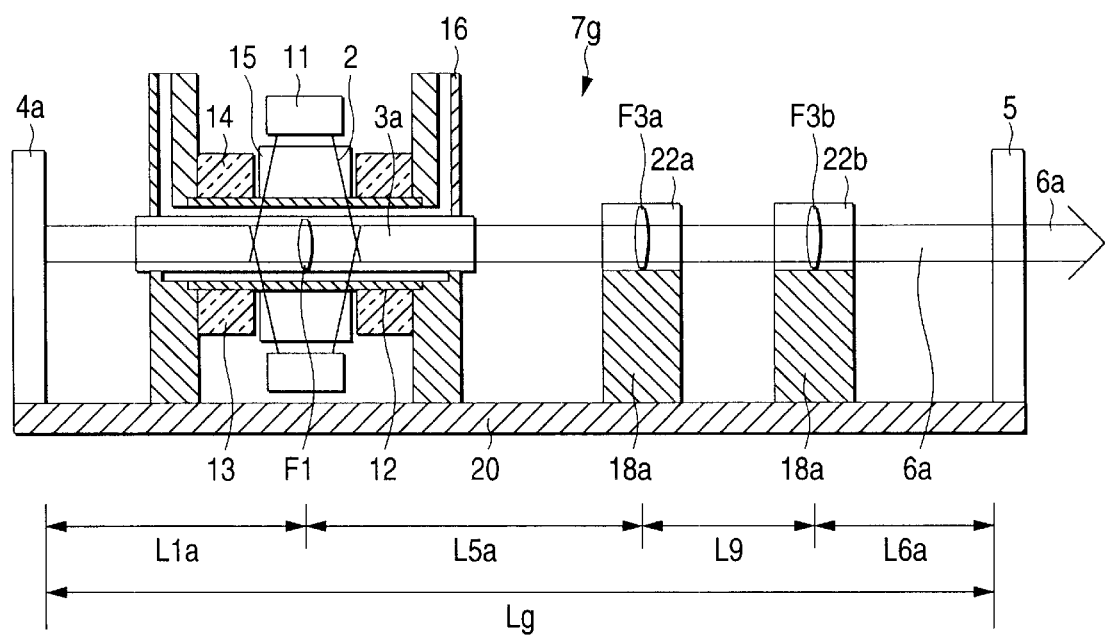
FIG. 8 is a vertical cross sectional view showing the structure of a solid-state laser apparatus according to a seventh embodiment of the present invention.

FIG. 8 is a vertical cross sectional view showing a solid-state laser apparatus according to a seventh embodiment of the present invention. Referring to the drawing, reference numerals 2, 6a, 11, 12, 13, 14, 15, 16, 18a and 20 represent the same elements as those of the solid-state laser apparatus according to the third embodiment. Reference numeral 22a represents first transmission optical device, 22b represents a second transmission optical device and 7g represents an optical resonator. Symbol Lg represents a length of the resonator, La1 represents a distance from the reflecting mirror 4a to the solid-state laser medium 3a, L5a represents a distance from the solid-state laser medium 3a to the first transmission optical device 22a, L6a represents a distance from the second transmission optical device 22b to the partial reflecting mirror 5 and L9 represents a distance from the first transmission optical device 22a to the second transmission optical device 22b. F1 represents a focal distance of a thermal-lens generated in the solid-state laser medium 3a, F3a represents a focal distance of a thermal lens generated in the first transmission optical device 22a and F3b represents a focal distance of a thermal lens generated in the second transmission optical device 22b. The optical resonator 7g is formed into a stable optical resonator by the reflecting mirror 4a, the solid-state laser medium 3a, the thermal lens F1 in the solid-state laser medium, the first transmission optical device 22a, the thermal lens F3a in the first transmission optical device, the second transmission optical device 22b, the thermal lens F3b in the second transmission optical device 22b and the partial reflecting mirror 5. That is, an assumption is made that the curvature radius of the reflecting mirror 4a is R1a and that of the partial reflecting mirror 5 is R2 and the following relationship is satisfied:

$$L0d = L1 + L9 + L6a + L5a - L1(L9 + L6a + L5a)/F1 - (L1 + L5a)$$

$$(L9 + L6a)/F3a - L6a(L1 + L9 + L5a)/F3b + L1L5a(L9 + L6a)/(F1\ F3a) + L9$$

$$L6a(L1 + L5a)/(F3a\ F3b) + L1\ L6a(L9 + L5a)/(F1\ F3b) - L1\ L9\ L6a\ L5a/(F1\ F3a\ F3b) \quad (34)$$

Then, the structure is formed to satisfy the following stabilizing condition for a resonator:

$$0 < (1 - (L9 + L6a + L5a)/F1 - (L9 + L6a)/F3a - L6a/F3b + L5a$$

$$(L9 + L6a)/(F1\ F3a) + L9\ L6a/(F3a\ F3b) + L6a(L9 + L5a)/(F1\ F3b) - L9\ L6a$$

$$L5a/(F1\ F3a\ F3b) - L0d/R1a)(1 - (L1 + L9 + L5a)/F3b - (L1 + L5a)/F3a -$$

$$L1/F1 + L1\ L5a/(F1\ F3a) + L9(L1 + L5a)/(F3a\ F3b) +$$

$$L1(L9 + L5a)/(F1\ F3b) - L1\ L9\ L5a/(F1\ F3a\ F3b) - L0d/R2) < 1 \quad (35)$$

In the solid-state laser apparatus structured as described above, portions of the fundamental-wave laser beam 6a and the harmonic-wave laser beam 6b are absorbed by the first transmission optical device 22a and the second transmission optical device 22b so as to be converted into heat. The first transmission optical device 22a and the second transmission optical device 22b heated with the above-mentioned heat are cooled by the cooling unit disposed adjacently. As a result, distribution of temperatures takes place in each of the first transmission optical device 22a and the second transmission optical device 22b in which the temperatures in the vicinity of the central portion are high and those adjacent to the side surfaces are low. Since change in the refractive indexes in the first transmission optical device 22a and the second transmission optical device 22b are substantially in proportion to the temperatures, the temperature distribution generated in the first transmission optical device 22a and the second transmission optical device 22b causes the refractive indexes in the first transmission optical device 22a and the second transmission optical device 22b to be varied. As a result, thermal lenses F3a and F3b are generated.

The optical resonator can be designed by a method similar-to that according to the fifth embodiment.

As described above, the solid-state laser apparatus according to this embodiment has the structure that the optical resonator is formed into a stable resonator by the reflecting mirror 4a, the solid-state laser medium 3a, the thermal lens F1 in the solid-state laser medium, the first transmission optical device 22a, the thermal lens F3a in the first transmission optical device, the second transmission optical device 22b, the thermal lens F3b in the second transmission optical device 22b and the partial reflecting mirror 5. Therefore, even if thermal lenses are generated in the plural transmission optical devices in the optical resonator, high-power fundamental-wave laser beams can stably be generated.

Since the method of designing the optical resonator of the solid-state laser apparatus according to this embodiment has the structure that the optical resonator is formed into a stable resonator by the reflecting mirror 4a, the solid-state laser medium 3a, the thermal lens F1 in the solid-state laser medium, the first transmission optical device 22a, the thermal lens F3a in the first transmission optical device, the second transmission optical device 22b, the thermal lens F3b in the second transmission optical device 22b and the partial reflecting mirror 5. Therefore, an optical resonator of a solid-state laser apparatus can be designed which is capable of efficiently and stably generating high-power laser beam even if thermal lenses are generated in a plurality of the transmission optical devices except for the solid-state laser medium because of a factor other than the exciting light.

Although this embodiment has the structure incorporating two transmission optical devices, three or more transmission optical devices may be employed. When the optical resonator is formed into a stable resonator by the reflecting mirror, the solid-state laser medium, the thermal lens in the solid-state laser medium, the plural transmission optical devices, thermal lenses in the plural transmission optical devices and the partial reflecting mirror, an effect similar to that of this embodiment can be obtained.

A plurality of solid-state laser mediums and a plurality of transmission optical devices may be employed. When the optical resonator is formed into a stable resonator by the reflecting mirror, the plural solid-state laser mediums, the thermal lenses in the plural solid-state laser mediums, the plural transmission optical devices, the thermal lenses in the plural transmission optical devices and the partial reflecting mirror, higher-power fundamental-wave laser beams can stably be generated.

Eighth Embodiment

Figure 9:
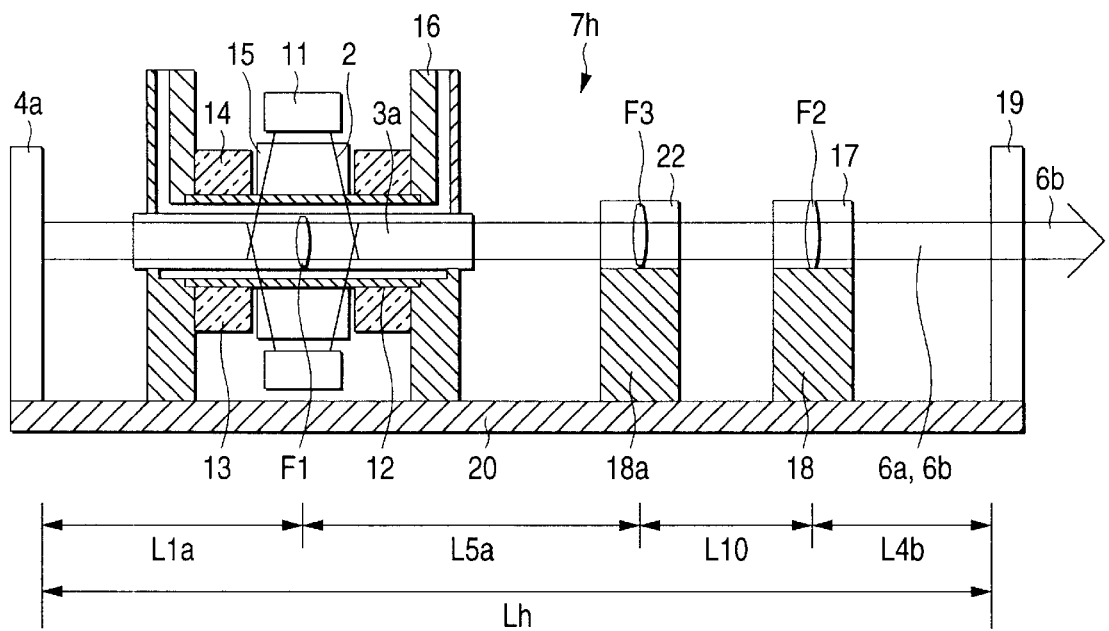
FIG. 9 is a vertical cross sectional view showing the structure of a solid-state laser apparatus according to an eighth embodiment of the present invention.

FIG. 9 is a vertical cross sectional view showing a solid-state laser apparatus according to an eighth embodiment of the present invention. Referring to the drawing, reference numerals 2, 6a, 6b, 11, 12, 13, 14, 15, 16, 18, 18a and 20 represent the same elements as those of the solid-state laser apparatus according to the third embodiment. Reference numeral 22 represents a transmission optical device, 17 represents the wavelength-converting device and 7h represents an optical resonator. Symbols Lh represents the length of the resonator, L1a represents a distance from the reflecting mirror 4a to the solid-state laser medium 3a, L5b represents a distance from the solid-state laser medium 3a to the transmission optical device 22, L4b represents a distance from the wavelength-converting device 17 to the harmonic mirror 19 and L10 represents a distance from the transmission optical device 22 to the wavelength-converting device 17. Symbol F1 represents a focal distance of a thermal lens generated in the solid-state laser medium 3a, F3 represents a focal distance of a thermal lens generated in the transmission optical device 22 and F2 represents a focal distance of a thermal lens generated in the wavelength-converting device 17. The optical resonator 7h is formed into a stable resonator by the reflecting mirror 4a, the solid-state laser medium 3a, the thermal lens F1 in the solid-state laser medium, the transmission optical device 22, the thermal lens F3 in the transmission optical device 22, the wavelength-converting device 17, the thermal lens F2 in the wavelength-converting device 17 and the harmonic mirror 19. That is, assumption is made that the curvature radius of the reflecting mirror 4a is R1a, that of the harmonic mirror 19 is R3 and the following relationship is satisfied:

$$L0e = L1a + L10 + L4b + L5b - L1a(L10 + L4b + L5b)/F1 - (L1a + L5b)$$

$$(L10 + L4b)/F3 - L4b(L1a + L10 + L5b)/F2 + L1a\ L5b(L10 + L4b)/(F1\ F3) + L10$$

$$L4b(L1a + L5b)/(F3\ F2) + L1a\ L4b(L10 + L5b)/(F1\ F2) - L1a\ L10\ L4b\ L5b/(F1\ F3\ F2) \quad (36)$$

Then, the stabilizing condition for a resonator is satisfied:

$$0 < (1 - (L10 + L4b + L5b)/F1 - (L10 + L4b)/F3 - L4b/F2 + L5b(L10 + L4b)/(F1\ F3) + L10\ L4b/(F3\ F2) + L4b(L10 + L5b)/(F1$$

$$F2) - L10\ L4b\ L5b/(F1\ F3\ F2) - L0e/R1a)(1 - (L1a + L10 + L5b)/F2 - (L1a + L5b)/F3 - L1a/F1 + L1a L5b/(F1F3)) + L10(L1a +$$

$$L5b)/(F3F2) + L1a(L10 + L5b)/(F1\ F2) - L1a\ L10\ L5b/(F1\ F3\ F2) - L0e/R3) < 1 \quad (37)$$

In the solid-state laser apparatus structured as described above, portions of the fundamental-wave laser beam 6a and the harmonic-wave laser beam 6b are absorbed by the transmission optical device 22 and the wavelength-converting device 17 so as to be converted into heat. The transmission optical device 22 and the wavelength-converting device 17 heated with the above-mentioned heat are cooled by the cooling unit disposed adjacently. As a result, temperature distribution is generated in the transmission optical device 22 and the wavelength-converting device 17 such that temperatures in the vicinity of the central portion are high and those adjacent to the side surfaces are low. Since change in the refractive indexes in the transmission optical device 22 and the wavelength-converting device 17 are substantially in proportion to the temperatures, the temperature distribution generated in the transmission optical device 22 and the wavelength-converting device 17 causes the refractive indexes to be varied in the transmission optical device 22 and the wavelength-converting device 17. Thus, thermal lenses F3 and F2 are generated.

The optical resonator can be designed by a method similar to that according to the fifth embodiment.

As described above, the solid-state laser apparatus according to this embodiment has the structure that the optical resonator is formed into a stable resonator by the reflecting mirror 4a, the solid-state laser medium 3a, the thermal lens F1 in the solid-state laser medium, the transmission optical device 22, the thermal lens F3 in the transmission optical device, the wavelength-converting device 17, the thermal lens F2 in the wavelength-converting device 17 and the harmonic mirror 19. Therefore, even if a thermal lens is generated in the transmission optical device and the wavelength-converting device in the optical resonator, high-power harmonic laser beams can stably be generated.

The method of designing the optical resonator of the solid-state laser apparatus according to this embodiment has the structure that the optical resonator is formed into a stable resonator by the reflecting mirror 4a, the solid-state laser medium 3a, the thermal lens F1 in the solid-state laser medium, the transmission optical device 22, the thermal lens F3 in the transmission optical device, the wavelength-converting device 17, the thermal lens F2 in the wavelength-converting device 17 and the harmonic mirror 19. Therefore, even if a thermal lens is generated in the transmission optical device and the wavelength-converting device except for the solid-state laser medium because of a factor other than exciting light, an optical resonator of a solid-state laser apparatus can be designed which is capable of efficiently and stably generating high-power laser beams.

Although this embodiment has the structure incorporating one transmission optical device and one wavelength-converting device, two or more transmission optical devices may be employed. When the optical resonator is formed into a stable resonator by the reflecting mirror, the solid-state laser medium, the thermal lens in the solid-state laser medium, the plural transmission optical devices, the thermal lenses in the plural transmission optical devices, the wavelength-converting device, the thermal lens in the wavelength-converting device and the harmonic mirror, an effect similar to that of this embodiment can be obtained. Two or more wavelength-converting devices may be employed. When the optical resonator is formed into a stable resonator by the reflecting mirror, the solid-state laser medium, the thermal lens in the solid-state laser medium, the transmission optical device, the thermal lens in the transmission optical device, the plural wavelength-converting devices, the thermal lenses in the plural wavelength-converting devices and the harmonic mirror, an effect similar to that of this embodiment can be obtained.

Although FIG. 9 shows the structure in which the solid-state laser medium, the transmission optical device and the wavelength-converting device are disposed in this sequential order, the configuration is not limited to this. The optical resonator may be formed into a stable resonator by the reflecting mirror 4a, the solid-state laser medium 3a, the thermal lens F1 in the solid-state laser medium, the transmission optical device 22, the thermal lens F3 in the transmission optical device, the wavelength-converting device 17, the thermal lens F2 in the wavelength-converting device 17 and harmonic mirror 19. In this case, an effect similar to that of this embodiment can be obtained.

A plurality of solid-state laser mediums, a plurality of transmission optical devices and a plurality of wavelength-converting devices may be employed. When the optical resonator is formed into a stable resonator by the reflecting mirror, the plural solid-state laser mediums, the thermal lenses in the plural solid-state laser mediums, the plural transmission optical devices, the thermal lenses in the plural transmission optical devices, the plural wavelength-converting devices, the thermal lenses in the plural wavelength-converting devices and the harmonic mirror, higher-power harmonic Laser beams can stably be generated.

Ninth Embodiment

Figure 10:
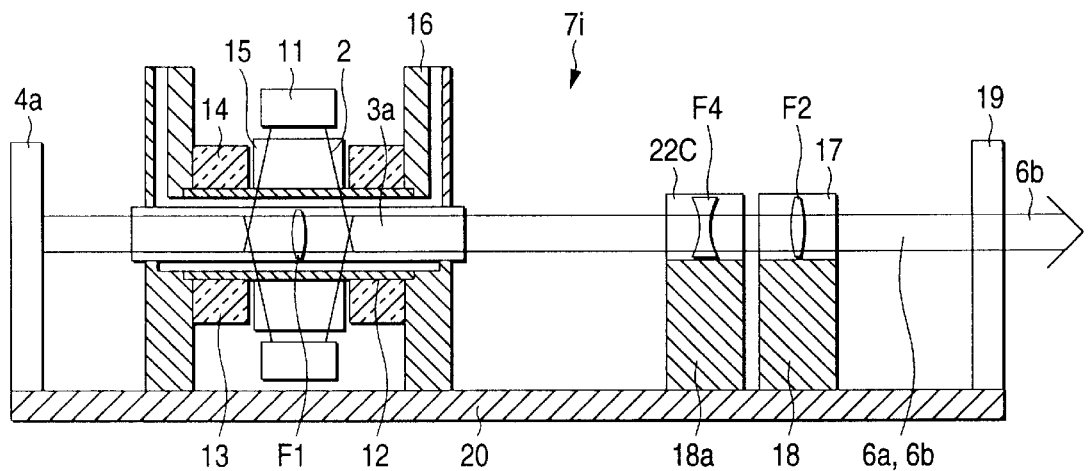
FIG. 10 is a vertical cross sectional view showing the structure of a solid-state laser apparatus according to a ninth embodiment of the present invention.

FIG. 10 is a vertical cross sectional view showing a solid-state laser apparatus according to a ninth embodiment of the present invention. Referring to the drawing, reference numerals 2, 6a, 6b, 11, 12, 13, 14, 15, 16, 18 and 20 represent the same elements of the solid-state laser apparatus according to the first embodiment. Reference numeral 7i represents an optical resonator. Reference numeral 22c represents a transmission optical device disposed adjacent to the wavelength-converting device 17 on the optical axis of the optical resonator 7i and having a change rate of the refractive index with temperature, the sign of which is in reverse to that of the change rate of the refractive index of the wavelength-converting device 17. Reference numeral 18a represents a cooling unit for cooling the transmission optical device 22c. Symbol F1 represents a focal distance of a thermal lens generated in the solid-state laser medium, F2 represents a focal distance of a thermal lens generated in the wavelength-converting device 17 and F4 represents a focal distance of a thermal lens generated in the transmission optical device 22c. The optical resonator 7i is formed into a stable resonator by the reflecting mirror 4a, the solid-state laser medium 3a, the thermal lens F1 in the solid-state laser medium, the transmission optical device 22c, the thermal lens F4 generated in the transmission optical device 22c, the wavelength-converting device 17, the thermal lens F2 generated in the wavelength-converting device and the harmonic mirror 19.

In the solid-state laser apparatus structured as described above, naturally emitted light generated by the solid-state laser medium 3a excited with exciting light 2 emitted from the semiconductor laser array 11 is amplified during reciprocation in the optical resonator so as to be converted into a fundamental-wave laser beam 6a having satisfactory directivity. The wavelength of a portion of the fundamental-wave laser beam 6a is converted by the wavelength-converting device 17 so as to be formed into a harmonic-wave laser beam 6b. The harmonic-wave laser beam 6b having the converted wavelength is allowed to pass through the harmonic mirror 19 so that the harmonic-wave laser beam 6b is extracted to the outside of the apparatus.

Portions of the fundamental-wave laser beam 6a and the harmonic-wave laser beam 6b are absorbed by the wavelength-converting device 17 and the transmission optical device 22c so as to be converted into heat. The wavelength-converting device 17 and the transmission optical device 22c heated with the above-mentioned heat are cooled by the cooling unit disposed adjacently. As a result, temperature distribution is generated in the wavelength-converting device 17 and the transmission optical device 22c such that the temperatures in the vicinity of the central portion are high and those adjacent to the side surface are low. Since the refractive index of the wavelength-converting device 17 and that of the transmission optical device 22c are substantially in proportion to the temperature, the temperature distribution generated in the wavelength-converting device 17 and the transmission optical device 22c causes the refractive indexes to be varied in the wavelength-converting device 17 and the transmission optical device 22c. As a result, thermal lenses F2 and F4 are generated. When a device made of a material having a refractive index temperature coefficient having a sign in reverse to that of the wavelength-converting device 17 is employed as the transmission optical device 22c, values of F2 and −F4 can be made to be substantially the same. Thus, the thermal lens F2 generated in the wavelength-converting device 17 can be canceled by the thermal lens F4 of the transmission optical device 22c. When the wavelength-converting device 17 is made of a nonlinear optical crystal, such as KTiOPO4 having a positive refractive index temperature coefficient, employment of an optical material, such as CaF2, BaF2, NaCl, KCl, AgCl or KBr, having a negative refractive index temperature coefficient enables the values of F2 and −F4 to be the same. Thus, the thermal lens F2 generated in the wavelength-converting device 17 can be canceled by the thermal lens F4 of the transmission optical device 22c. The cancellation of the thermal lens with F4 may be performed by combining change in F2 and that in F1.

Since the solid-state laser apparatus according to this embodiment is able to cancel the thermal lens generated in the wavelength-converting device with the transmission optical device, the operation range permitted for the solid-stage laser satisfying the stabilizing condition for a resonator can be widened. Thus, high-power harmonic laser beams can stably be generated.

This embodiment has a structure that one transmission optical device 22c is employed such that the transmission optical device 22c is disposed between the wavelength-converting device 17 and the solid-state laser medium 3a. The transmission optical device 22c may be disposed between the wavelength-converting device 17 and the harmonic mirror 19. A plurality of transmission optical devices may be employed such that they are disposed on the two sides of the wavelength-converting device 17. When, for example, two transmission optical devices are employed and assumption is made that the thermal lenses generated in the two transmission optical devices are F4a and F4b and the focal distance of the thermal lens generated in the wavelength-converting device is F2, a structure in which the values of (1/F4a+1/F4b) and −1/F2 are made to be substantially the same enables the thermal lens generated in the wavelength-converting device to be canceled by the thermal lens generated in the transmission optical device.

Tenth Embodiment

Figure 11:
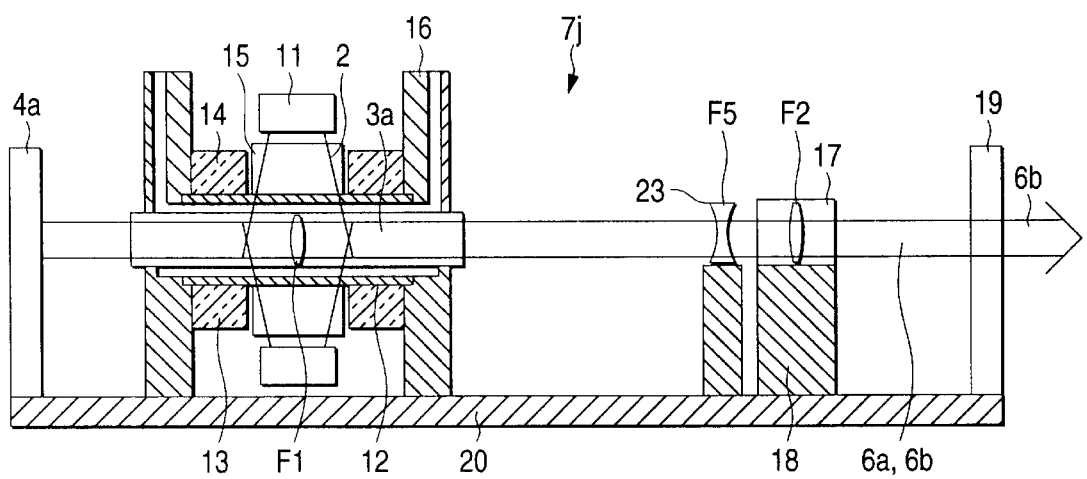
FIG. 11 is a vertical cross sectional view showing the structure of a solid-state laser apparatus according to a tenth embodiment of the present invention.

FIG. 11 is a vertical cross sectional view showing a solid-state laser apparatus according to a tenth embodiment of the present invention. Referring to the drawing, reference numerals 2, 6a, 6b, 11, 12, 13, 14, 15, 16, 18 and 20 represent the same elements as those of the solid-state laser apparatus according to the first embodiment. Reference numeral 7j represents an optical resonator. Reference numeral 23 represents a lens disposed adjacent to the wavelength-converting device 17 on the optical axis of the optical resonator 7i and having a focal distance F5 having a sign in reverse to that of the focal distance F2 of the thermal lens generated in the wavelength-converting device 17. The optical resonator 7a is formed into a stable resonator by the reflecting mirror 4a, the solid-state laser medium 3a, the thermal lens F1 in the solid-state laser medium, the lens 23, the wavelength-converting device 17, the thermal lens F2 generated in the wavelength-converting device and the harmonic mirror 19.

The solid-state laser apparatus structured as described above is arranged such that the lens 23 having the focal distance F5 having a sign in reverse to that of the thermal lens F2 generated in the wavelength-converting device 17 because of absorption of a portion of the fundamental-wave laser beam 6a and that of the harmonic-wave laser beam 6b is disposed adjacent to the wavelength-converting device. When the lens 23 in which the values of F5 and −F2 are substantially the same is employed, the thermal lens F2 generated in the wavelength-converting device can be canceled by the lens 23.

The solid-state laser apparatus according to this embodiment is able to cancel the thermal lens generated in the wavelength-converting device with the lens. Therefore, the operation range for the solid-state laser satisfying the stabilizing condition for a resonator can be widened. Thus, high-power harmonic laser beams can furthermore stably be generated.

This embodiment has the structure that one lens 23 is employed so as to be disposed between the wavelength-converting device 17 and the solid-state laser medium 3a. However, the lens 23 may be disposed between the wavelength-converting device 17 and the harmonic mirror 19. A plurality of lenses may be employed so as to be disposed on the two sides of the wavelength-converting device 17. When, for example, two lenses are employed and assumption is made that the focal distances of the two lenses are F5a and F5b and the focal distance of the thermal lens generated in the wavelength-converting device is F2, a structure in which the values of $(1/F5a+1/F5b)$ and $-1/F2$ are made to be substantially the same enables the thermal lens generated in the wavelength-converting device to be canceled by the lenses.

Eleventh Embodiment

Figure 12:
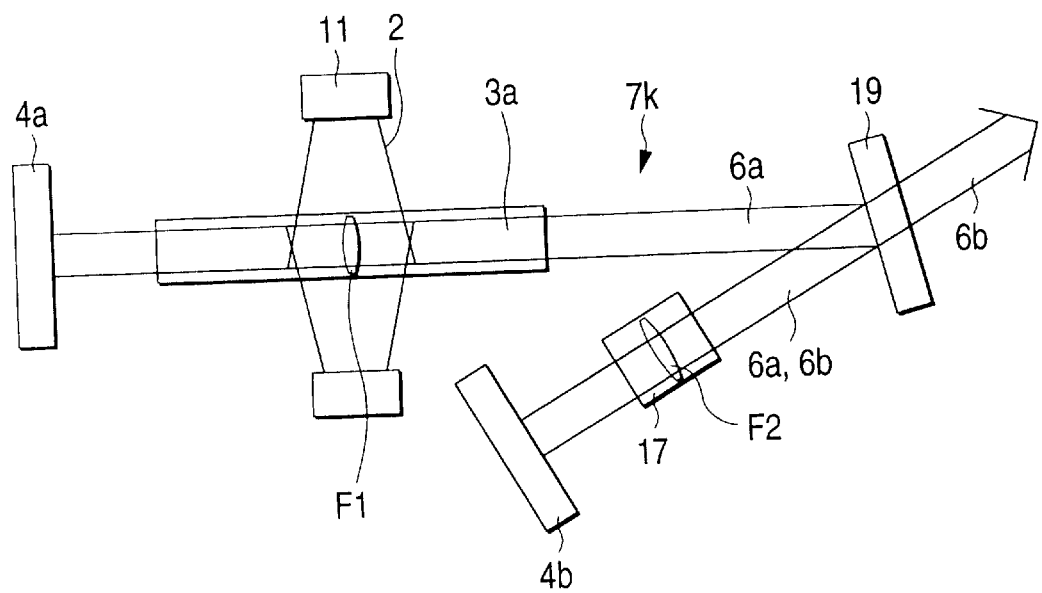
FIG. 12 is a vertical cross sectional view showing the structure of a solid-state laser apparatus according to an elevenths embodiment of the present invention.
Figure 13:
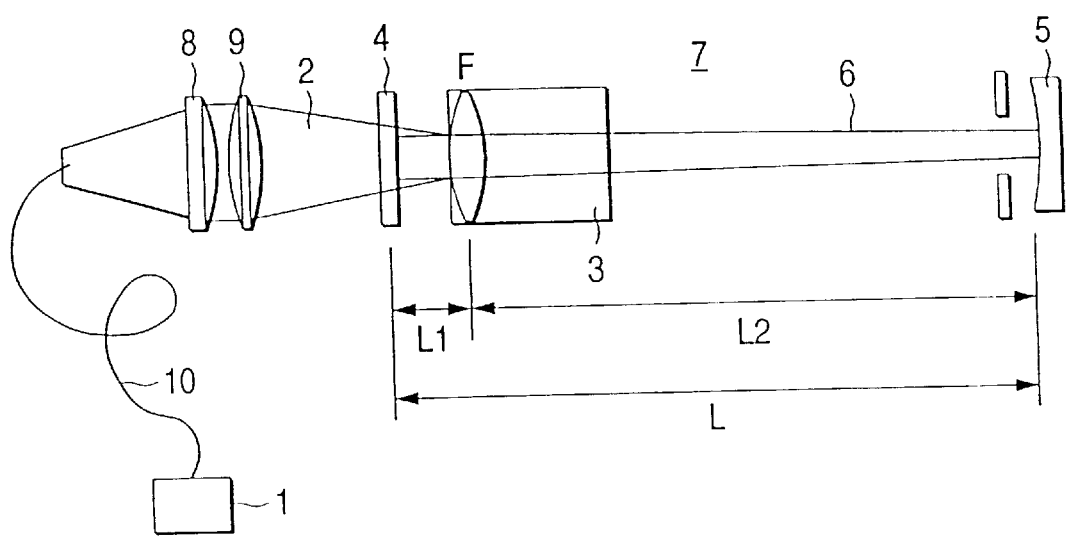
FIG. 13 is a diagram showing the structure of a conventional solid-state laser apparatus.

FIG. 12 is a diagram showing the structure of a solid-state laser apparatus according to an eleventh embodiment of the present invention. Referring to the drawing, reference numerals 2, 3a, 6a, 6b, 11, F1 and F2 represent the same elements as those of the solid-state laser apparatus according to the first embodiment. Reference numerals 4a and 4b represent reflecting mirrors, 19 represents a harmonic mirror, 17 represents a wavelength-converting device and 7k represents an optical resonator. In the drawing, the flow tube, the light converging unit, the opening, the light conductive optical device, the side plates, the cooling unit, the frame, the power source for supplying an electric current to the semiconductor laser array 11, the cooling medium, the cooling-medium circulating unit for circulating the cooling medium and the tube are omitted.

This embodiment has a structure that the optical resonator 7k according to the first embodiment is returned by the harmonic mirror 19. Moreover, the wavelength-converting device 17 is disposed between the harmonic mirror 19 and the reflecting mirror 4b. When L1a represents the direction from the reflecting mirror 4a to the solid-state laser medium 3a, L3 represents a distance from the solid-state laser medium 3a to the wavelength-converting device 17 and L4 represents a distance from the wavelength-converting device 17 to the reflecting mirror 4b, an optical resonator can be designed by a method similar to that according to the first embodiment. Thus, an effect similar to that of the first embodiment can be obtained. Also the harmonic-wave laser beam 6b generated from the wavelength-converting device 17 adjacent to the reflecting mirror 4b can be reflected by the reflecting mirror 4b so that the harmonic-wave laser beam is-extracted from the harmonic mirror 19. Thus, higher-power harmonic laser beams can be generated.

This embodiment has the structure that the optical resonator is returned by the harmonic mirror one time. The optical resonator may be returned by the harmonic mirror and the reflecting mirror two or more times.

In each of the foregoing embodiments, the solid-state laser medium is Nd:YAG (Nd:Yttrium Aluminum Garnet). The present invention is not limited to the foregoing material. Any solid-state laser medium may be employed if it can be excited with light.

In each of the foregoing embodiments, the exciting light source is the semiconductor laser array. The present invention is not limited to this. Any exciting light source, for example, a semiconductor laser or a lamp, may be employed if it is able to excite the solid-state laser medium.

In each of the foregoing embodiments, the wavelength-converting device is $KTiOPO4$ or $LiBO3$. The present invention is not limited to this. Nonlinear optical crystal which converts the wavelength of the fundamental-wave laser beam and which generates a thermal lens therein may be employed.

As was described above, the solid-state laser apparatus having an optical resonator according to the present invention can stably generate high-power harmonic-wave laser beams.

What is claimed is:

1. A solid-state laser apparatus having an optical resonator, said optical resonator comprising:

at least one solid-state laser medium extending in a direction of an optical axis of a laser beam and containing an active solid medium therein;

an exciting light source for exciting said solid-state laser medium and generating a thermal lens in said solid-state laser medium;

at least one wavelength-converting device for converting a wavelength of the laser beam, absorbing a portion of the laser beam and generating a thermal lens therein; and an optical device having at least one reflecting mirror and at least one harmonic mirror for resonating the laser beam emitted from said solid-state laser medium and extracting the laser beam having the wavelength converted by said wavelength-converting device;

wherein stable conditions are satisfied for a combination of said solid-state laser medium, said thermal lens generated in said solid-state laser medium, said wavelength-converting device, said thermal lens generated in said wavelength-converting device, said reflecting mirror and said harmonic mirror.

2. A solid-state laser apparatus according to claim 1, wherein said optical resonator further comprises at least one transmission optical device for absorbing a portion of the laser beam and generating a thermal lens therein, wherein stable conditions are satisfied for a combination of said solid-state laser medium, said thermal lens generated in said solid-state laser medium, said wavelength-converting device, said thermal lens generated in said wavelength-converting device, said transmission optical device, said thermal lens generated in said transmission optical device, said reflecting mirror and said harmonic mirror.

3. A solid-state laser apparatus having an optical resonator, said optical resonator comprising:
   at least one solid-state laser medium extending in a direction of an optical axis of a laser beam and containing an active solid medium therein;
   an exciting light source for exciting said solid-state laser medium and generating a thermal lens in said solid-state laser medium;
   at least one transmission optical device for absorbing a part of the laser beam and generating a thermal lens therein; and
   an optical device including at least one reflecting mirror and at least one partial reflecting mirror for extracting the laser beam from said solid-state laser medium;
   wherein stable conditions are satisfied for a combination of said solid-state laser medium, said thermal lens generated in said solid-state laser medium, said transmission optical device, said thermal lens generated in said transmission optical device, said reflecting mirror and said partial reflecting mirror.

4. A solid-state laser apparatus according to claim 1, wherein said optical resonator further comprises: at least one transmission optical device having a rate of change in a refractive index with temperature having a reverse sign to that of a rate of change in refractive index with temperature of said wavelength-converting device, absorbing a portion of the laser beam and generating a thermal lens therein.

5. A solid-state laser apparatus according to claim 1 wherein said optical resonator further comprises: at least one lens having a focal distance having a reverse sign to that of said thermal lens generated in said wavelength-converting device.

6. A solid-state laser apparatus according to claim 1, wherein said exciting light source comprises a semiconductor laser unit.

7. A solid-state laser apparatus according to claim 1, wherein distances among said solid-state laser medium, said wavelength-converting device, said reflecting mirror and said harmonic mirror are determined in such a manner that beam matrix elements A, B, C and D indicating one reciprocating motion of said optical resonator satisfy a relationship $-1<(A+D)/2<1$.

8. A solid-state laser apparatus according to claim 7, wherein said optical resonator further comprises at least one transmission optical device for absorbing a portion of laser beam and generating a thermal lens therein, and distances among said solid-state laser medium, said wavelength-converting device, said transmission optical device, said reflecting mirror and said harmonic mirror are determined in such a manner that beam matrix elements A, B, C and D indicating one reciprocating motion of said optical resonator satisfy a relationship $-1<(A+D)/2<1$.

9. A solid-state laser apparatus according to claim 3, wherein distances among said solid-state laser medium, said transmission optical device, said reflecting mirror and said partial reflecting mirror are determined in such a manner that beam matrix elements A, B, C and D indicating one reciprocating motion of said optical resonator satisfy a relationship $-1<(A+D)/2<1$.

10. A solid-state laser apparatus according to claim 7, wherein the distances among said solid-state laser medium, said wavelength-converting device, said reflecting mirror and said harmonic mirror are determined in such a manner that beam matrix elements A, B, C and D indicating one reciprocating motion of said optical resonator satisfy a relationship $-0.99<(A+D)/2<0.99$.

11. A solid-state laser apparatus according to claim 10, wherein said optical resonator further comprises at least one transmission optical device for absorbing a portion of the laser beam and generating a thermal lens therein, and distances among said solid-state laser medium, said wavelength-converting device, said transmission optical device, said reflecting mirror and said harmonic mirror are determined in such a manner that beam matrix elements A, B, C and D indicating one reciprocating motion of said optical resonator satisfy a relationship $-0.99<(A+D)/2<0.99$.

12. A solid-state laser apparatus according to claim 3, wherein distances among said solid-state laser medium, said transmission optical device, said reflecting mirror and said partial reflecting mirror are determined in such a manner that beam matrix elements A, B, C and D indicating one reciprocating motion of said optical resonator satisfy a relationship $-0.99<(A+D)/2<0.99$.

13. A solid-state laser apparatus according to claim 1, wherein distances among said solid-state laser medium, said wavelength-converting device, said reflecting mirror and said harmonic mirror are determined in such a manner that beam matrix elements A1, B1, C1 and D1, which are realized when an output value from said exciting light source is a different value from an output value from said exciting light source at which beam matrix elements A, B, C and D indicating one reciprocating motion of said optical resonator satisfy $-1<(A+D)/2<1$, and which indicate one reciprocating motion of said optical resonator, satisfy a relationship $(A1+D1)/2=(A+D)/2$ or $(A1+D1)/2=-(A+D)/2$.

14. A solid-state laser apparatus according to claim 13, wherein said optical resonator further comprises at least one transmission optical device for absorbing a portion of the laser beam and generating a thermal lens therein, and distances among said solid-state laser medium, said wavelength-converting device, said transmission optical device, said reflecting mirror and said harmonic mirror are determined in such a manner that beam matrix elements A1, B1, C1 and D1, which are realized when an output value from said exciting light source is a different value from an output value from said exciting light source at which beam matrix elements A, B, C and D indicating one reciprocating motion of said optical resonator satisfy $-1<(A+D)/2<1$, and which indicate one reciprocating motion of said optical resonator, satisfy a relationship $(A1+D1)/2=(A+D)/2$ or $(A1+D1)/2=-(A+D)/2$.

15. A solid-state laser apparatus according to claim 3, wherein distances among said solid-state laser medium, said transmission optical device, said reflecting mirror and said partial reflecting mirror are determined in such a manner that beam matrix elements A1, B1, C1 and D1, which are realized when an output value from said exciting light source is a different value from an output value from said exciting light source at which beam matrix elements A, B, C and D indicating one reciprocating motion of said optical resonator satisfy $-1<(A+D)/2<1$, and which indicate one reciprocating motion of said optical resonator, satisfy a relationship $(A1+D1)/2=(A+D)/2$ or $(A1+D1)/2=-(A+D)/2$.

\* \* \* \* \*